(12) United States Patent
Dong et al.

(10) Patent No.: US 8,285,098 B2
(45) Date of Patent: Oct. 9, 2012

(54) WIDE BANDWIDTH, LOW LOSS PHOTONIC BANDGAP FIBERS

(75) Inventors: Liang Dong, Clemson, SC (US); Brian K. Thomas, Brighton, MI (US); Shigeru Suzuki, Ann Arbor, MI (US); Libin Fu, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 12/893,945

(22) Filed: Sep. 29, 2010

(65) Prior Publication Data

US 2011/0085769 A1    Apr. 14, 2011

Related U.S. Application Data

(63) Continuation-in-part of application No. 12/750,559, filed on Mar. 30, 2010, now abandoned.

(60) Provisional application No. 61/165,328, filed on Mar. 31, 2009, provisional application No. 61/319,208, filed on Mar. 30, 2010, provisional application No. 61/329,479, filed on Apr. 29, 2010.

(51) Int. Cl.
*G02B 6/02* (2006.01)
*C03B 37/023* (2006.01)
*C03B 37/028* (2006.01)

(52) U.S. Cl. .......... 385/123; 385/125; 385/127; 65/385; 65/412

(58) Field of Classification Search ............... 385/12, 385/14, 122–127, 141; 65/385, 407, 409, 65/410, 412; 264/1.28
See application file for complete search history.

(56) References Cited

U.S. PATENT DOCUMENTS

| | | | |
|---|---|---|---|
| 6,845,204 B1 | 1/2005 | Broeng | |
| 6,954,574 B1 * | 10/2005 | Russell et al. | ........ 385/125 |
| 7,190,705 B2 | 3/2007 | Fermann | |
| 7,209,619 B2 | 4/2007 | Dong | |
| 7,280,730 B2 | 10/2007 | Dong et al. | |
| 7,403,689 B2 | 7/2008 | Koch | |
| 7,418,836 B2 | 9/2008 | Dong | |

(Continued)

FOREIGN PATENT DOCUMENTS

WO    WO 2010/114847    10/2010

OTHER PUBLICATIONS

Couny F. et al, "Large Pitch Kagome-Structured Hollow-Core Photonic Crystal Fiber" Opt. Letters, vol. 31, No. 24, pp. 3574-3576, Dec. 15, 2006.

(Continued)

*Primary Examiner* — Brian M. Healy
*Assistant Examiner* — Hung Lam
(74) *Attorney, Agent, or Firm* — Knobbe, Martens, Olson & Bear, LLP

(57) ABSTRACT

Various embodiments include photonic bandgap fibers (PBGF). Some PBGF embodiments have a hollow core (HC) and may have a square lattice (SQL). In various embodiments, SQL PBGF can have a cladding region including 2-10 layers of air-holes. In various embodiments, an HC SQL PBGF can be configured to provide a relative wavelength transmission window $\Delta\lambda/\lambda c$ larger than about 0.35 and a minimum transmission loss in a range from about 70 dB/km to about 0.1 dB/km. In some embodiments, the HC SQL PBGF can be a polarization maintaining fiber. Methods of fabricating PBGF are also disclosed along with some examples of fabricated fibers. Various applications of PBGF are also described.

29 Claims, 30 Drawing Sheets

U.S. PATENT DOCUMENTS

| | | | |
|---|---|---|---|
| 7,792,394 | B2 | 9/2010 | Dong |
| 7,804,864 | B2 | 9/2010 | Gu |
| 7,970,248 | B2 | 6/2011 | Dong et al. |
| 2005/0276556 | A1 | 12/2005 | Williams |
| 2007/0009216 | A1* | 1/2007 | Russell et al. ............. 385/123 |
| 2007/0163301 | A1 | 7/2007 | Dong et al. |
| 2008/0056656 | A1 | 3/2008 | Dong et al. |
| 2009/0207483 | A1 | 8/2009 | Goto |
| 2010/0247046 | A1 | 9/2010 | Dong |

OTHER PUBLICATIONS

Chen M-Y et. al., "Square-Structured Photonic Bandgap Fibers", Optics Communications, vol. 235, pp. 63-67, May 2004.

Buczynsky R. et. al. "Hollow-Core Photonic Crystal Fibers With Square Lattice", Proc. of SPIE, vol. 5950, pp. 595015-1 to 595015-8, Sep. 2005.

Poletti F. et. al. "Hollow-Core Photonic Bandgap Fibers Based on a Square Lattice Cladding", Opt. Lett., vol. 32, No. 16, pp. 2282-2284, Aug. 15, 2007.

International Search Report and Written Opinion for International Application No. PCT/US2010/029250 filed Mar. 30, 2010, in 9 pages, mailing date Jun. 1, 2010.

International Preliminary Report on Patentability for International Application No. PCT/US2010/029250 filed Mar. 30, 2010, in 6 pages, dated Oct. 4, 2011.

Liang Dong et al., "Extending transmission bandwidth of air-core photonic bandgap fibers," Optical Fiber Technology, vol. 16, issue 6, pp. 442-448, available online Aug. 30, 2010.

Office Action for U.S. Appl. No. 12/750,559, dated Oct. 6, 2011, in 6 pages.

Written Declaration of Abandonment Pursuant to 37 CFR§ 1.138(a), filed Feb. 1, 2012 in U.S. Appl. No. 12/750,559, in 2 pages.

* cited by examiner

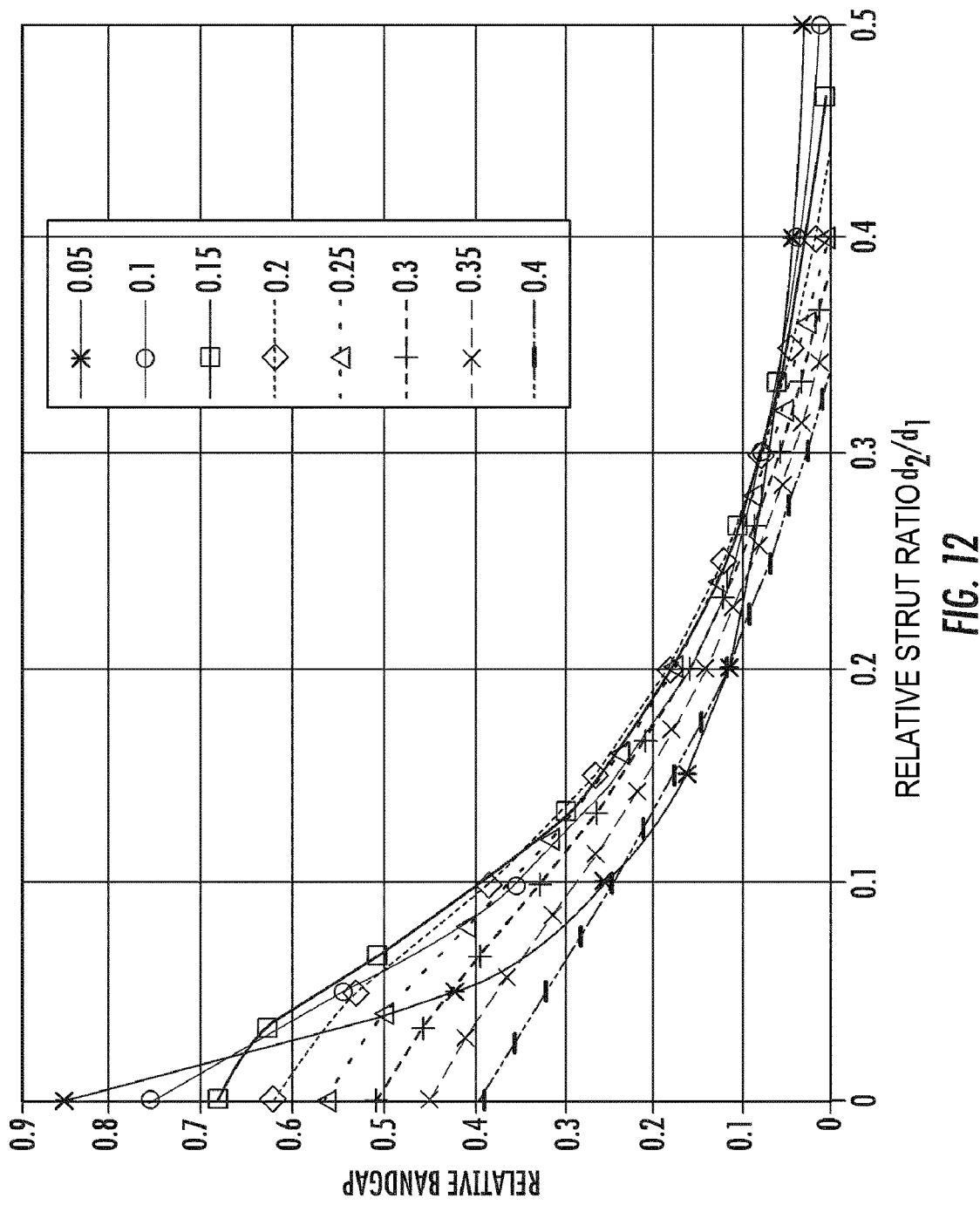

WIDE BANDWIDTH, LOW LOSS PHOTONIC BANDGAP FIBERS

CROSS-REFERENCE TO RELATED APPLICATIONS

This application is a continuation-in-part of U.S. patent application Ser. No. 12/750,559, filed Mar. 30, 2010, entitled "WIDE BANDWIDTH, LOW LOSS PHOTONIC BANDGAP FIBERS," which claims the benefit under 35 U.S.C. §119(e) of U.S. Provisional Patent Application No. 61/165,328, filed Mar. 31, 2009, entitled "WIDE BANDWIDTH, LOW LOSS PHOTONIC BANDGAP FIBERS." This application claims the benefit under 35 U.S.C. §119(e) of U.S. Provisional Patent Application No. 61/319,208, filed Mar. 30, 2010, entitled "WIDE BANDWIDTH, LOW LOSS PHOTONIC BANDGAP FIBERS," and U.S. Provisional Patent Application No. 61/329,479, filed Apr. 29, 2010, entitled "WIDE BANDWIDTH, LOW LOSS PHOTONIC BANDGAP FIBERS." Each of the above-identified applications is hereby incorporated by reference herein in its entirety.

This application is related to U.S. Pat. No. 7,209,619, entitled "PHOTONIC BANDGAP FIBERS," issued on Apr. 24, 2007, U.S. Pat. No. 7,418,836, entitled "PHOTONIC BANDGAP FIBERS," issued on Sep. 2, 2008, and U.S. Pat. No. 7,792,394, entitled "PHOTONIC BAND GAP FIBERS," issued on Sep. 7, 2010. Each of the above-identified patents is hereby incorporated by reference herein in its entirety.

BACKGROUND

1. Field

This application relates to optical fibers in general and to photonic bandgap fibers in particular. Some aspects of this application are directed towards a photonic bandgap fiber having increased transmission bandwidth.

2. Description of Related Art

Hollow core (HC) photonic bandgap fibers (PBGF) can be useful for many applications. Light in hollow core photonic bandgap fibers is substantially confined to a hollow core by a photonic bandgap in the cladding structure. Because light is largely guided in the air in hollow core PBGFs, high nonlinear thresholds can be obtained. The high nonlinear threshold as a result of light guided mostly in air provides for a wide range of applications. For example, high energy pulse compression and wavelength-tunable Raman solutions are some possible applications that have been demonstrated recently. Transmission, delivery and shaping of optical pulses with very high peak powers are also possible in such fibers. HC PBGFs can also be useful for spectroscopy of gases due to the increase in interaction length when light is in a low loss guided mode.

HC PBGFs with hexagonally arranged cladding structures have been demonstrated and studied in the last decade. HC PBGFs having low loss, for example approximately 1 dB/km, and having a bandgap of approximately 300 nm centered around 1550 nm have been previously reported. In some embodiments, the limited width of the bandgap can be a practical constraint. For example, in some embodiments, the center of the bandgap may need to be carefully controlled to provide the correct transmission characteristic at a pre-determined wavelength. In some embodiments, the bandgap width can also be important for applications that require low third order dispersion, such as pulse shaping, and for applications which require wide bandgaps for new wavelength generation and spectroscopy.

SUMMARY

Various embodiments include hollow core (HC) photonic bandgap fibers (PBGFs) with a square lattice (SQL) configured with a wide transmission window and low loss. Various embodiments described herein include fibers that are fabricated with core and cladding pressure control that improves the air filling fraction. In at least some embodiments, a relative transmission window of at least about 35% ($\Delta\lambda/\lambda c=0.35$) is obtained, and up to about 65% can be obtained, when $\Delta\lambda$ is measured by the width of the transmission curve at approximately 10% of the maximum intensity. Some embodiments describe a SQL photonic bandgap fiber with relative bandgap above about 40%. Without subscribing to or requiring any theory, in various embodiments, the relative bandgap can be similar to the relative wavelength transmission window $\Delta\lambda/\lambda c$, wherein $\lambda c$ is the center wavelength of the transmission curve.

In various embodiments described herein a HC SQL PBGF may be utilized for delivery of high peak power optical pulses, pulse shaping, or in sensor applications. Some embodiments described herein comprise a method for fabrication of a HC PBGFs. Various embodiments described herein comprise a method for fabricating a polarization maintaining (PM) HC PBGF. Various embodiments of a HC SQL PBGF may comprise 2-10 layers of air-holes. Some embodiments describe a fiber having $\Delta\lambda/\lambda c=0.45$ and a loss as low as approximately 70 dB/km with 5 layers of air holes.

Various embodiments described herein comprise a photonic bandgap fiber (PBGF) for propagating light having a wavelength, $\lambda$. In some embodiments, the fiber comprises a core, and a cladding disposed about the core. The cladding may comprise a plurality of regions, at least one region having a dimension, $\Lambda$, and configured such that the cladding at least partially surrounds a hole having a hole dimension, D. In some embodiments, the plurality of regions may be arranged as a rectangular lattice. In some such embodiments, the rectangular lattice may comprise a square lattice (e.g., a lattice having four-fold rotational symmetry). In various embodiments, the portions of the cladding form webs and nodes of the lattice such that at least a portion of the webs have a dimension, $d_2$, and are configured as higher aspect ratio cladding material portions. A portion of the webs may be connected to the nodes and at least a portion of the nodes may have a dimension, $d_1$, and be configured as lower aspect ratio cladding material portions. In various embodiments, $D/\Lambda$ is in a range from about 0.9 to about 0.995 and the PBGF is configured such that a relative wavelength transmission window $\Delta\lambda/\lambda c$ is larger than about 0.35.

In various embodiments, the webs have a second dimension $d_3$, such that the ratio of $d_3$ to $d_2$ is at least approximately 5:1. In various embodiments the ratio of $d_3$ to $d_2$ is at least approximately 10:1 or at least 25:1.

In various embodiments, $d_2/\Lambda$ maybe in a range from about 0.01 to about 0.1, and $d_1/\Lambda$ in a range from about 0.1 to about 0.5. In various embodiments, $\Delta\lambda/\lambda c$ may be in the range from about 0.35 to about 0.65. In various embodiments, the rectangular lattice may comprise 2 to 5 layers of cladding material. In various embodiments, the fiber is drawn from a preform having webs and nodes having sizes larger than $d_1$ and $d_2$, and the PBGF is configured such that a relative reduction in the node size is substantially less than a relative reduction in the web size. In various embodiments, the preform may be configured with preform parameters $D/\Lambda=0.5$-$0.95$, $d_2/\Lambda=0.05$-$0.5$, and $d_1/\Lambda=0.2$-$0.6$. In various embodiments, an air filling fraction may exceed about 80%, and be up to about 95%. In various embodiments, a dimension of the core may be in a range from about 10 μm to about 100 μm. In various embodiments, the fiber may be configured as a polarization maintaining (PM) SQL PBGF. In various embodiments the holes may contain air. In various embodiments, at least a portion of the high index cladding glass may comprise silica.

Various embodiments comprise a method of fabricating such a SQL PBGF. The method comprises stacking capillaries and rods to form a rectangular lattice. The rods can comprise an optical material. The method comprises constructing a preform, and drawing the preform into a fiber. In some embodiments, the method comprises controlling core and cladding pressure during the drawing, with the core and cladding pressurized with different pressures. The controlling of the core and cladding pressures narrows a web dimension, $d_2$, and substantially limits changes in node dimension, $d_1$, of the SQL PBGF such that $D/\Lambda$ is in a range from about 0.9 to about 0.99.

In various embodiments, cladding holes may be pressurized from about 0.5 to about 2.5 psi and the core may be pressurized from about of 0.2 to about 2 psi, and the pressurization of cladding holes exceeds pressurization of the core. In various embodiments a web dimension, $d_2$, is less than about 0.25 μm.

Various embodiments comprise a method of making a polarization maintaining (PM) PBGF. The method comprises forming a cane comprising a lattice of cladding regions, and a core. The cane has a substantially circular outer diameter, and comprises an optical material. The method comprises forming a circular preform using the cane, modifying the circular preform to form a non-circular shape, and drawing the preform into a fiber. The method comprises transforming four-fold symmetry of the lattice into two-fold symmetry by deforming the core and the cladding during the drawing, thereby introducing birefringence into the fiber. In various embodiments the non-circular shape comprises flat boundary portions disposed opposite each other, and at a non-zero angle relative to axes defining the lattice. In various embodiments the lattice comprises a rectangular lattice.

Various embodiments described herein comprise a system for telecommunications, gas measurement, delivery of high peak power pulses, or laser pulse shaping, comprising a PBGF such as, e.g., an HC PBGF, an SQL PBGF, a PM SQL PBGF, and so forth.

In some embodiments, a SQL PBGF is disclosed. The SQL PBGF comprises a cladding region having 2-10 layers of air-holes and configured to provide a relative wavelength transmission window $\Delta\lambda/\lambda c$ larger than about 0.35 and minimum transmission loss in a range from about 70 dB/km to about 0.1 dB/km.

In various embodiments a photonic bandgap fiber (PBGF) for propagating light having a wavelength, $\lambda$, is disclosed. The PBGF fiber comprises a core; and a cladding region disposed about said core. The cladding region may comprise a plurality of features, the features having a periodicity, $\Lambda$. The cladding region may be configured such that the cladding region at least partially surrounds a hole having a hole dimension, D. In various embodiments, the plurality of features maybe arranged as a rectangular lattice. The cladding region may comprise webs and nodes of the lattice such that the webs have a width, $d_2$, and are configured as higher aspect ratio cladding material portions. In various embodiments, the webs may be connected to the nodes, the nodes having a dimension, $d_1$, and configured as lower aspect ratio cladding material portions. In some embodiments, the $D/\Lambda$ may be in a range from about 0.9 to about 0.995 and the PBGF is configured such that a relative wavelength transmission window $\Delta\lambda/\lambda c$ is larger than about 0.35.

In various embodiments a photonic bandgap fiber (PBGF) for propagating light having a wavelength, $\lambda$ is disclosed. The PBGF comprises a core; and a cladding disposed about said core. In various embodiments, the cladding comprises a plurality of regions, at least one region having a dimension, $\Lambda$, and is configured such that the cladding at least partially surrounds a hole having a hole dimension, D. In various embodiments, said plurality of regions can be arranged as a rectangular lattice. In various embodiments, the portions of the cladding can form webs and nodes of the lattice such that at least a portion of the webs have a dimension, $d_2$, and are configured as higher aspect ratio cladding material portions. In various embodiments, a portion of the webs are connected to the nodes. In various embodiments, at least a portion of the nodes can have a dimension, $d_1$, and are configured as lower aspect ratio cladding material portions. In various embodiments, the rectangular lattice can comprise 2 to 5 layers of cladding material. In various embodiments, the $D/\Lambda$ can be in a range from about 0.9 to about 0.995 and the PBGF can be configured such that $d_2/d_1$ is less than approximately 0.15. In various embodiments, $d_1/\Lambda$ can be in a range from about 0.05 to about 0.3, and the PBGF can be configured such that $\Delta\lambda/\lambda c$ is in the range from about 0.35 to about 0.85. In various embodiments, $\Delta\lambda/\lambda c$ can be in the range from about 0.5 to about 0.85. In various embodiments, the PBGF can have a relative bandgap greater than approximately 0.4.

A method of fabricating a PBGF having a core and cladding disposed about the core is disclosed. In various embodiments, the cladding can comprise a plurality of regions, at least one region having a dimension L. In various embodiments, the cladding can at least partially surround a hole having a hole dimension D. In various embodiments, the plurality of cladding regions can be arranges as a rectangular or square lattice. In various embodiments, the portions of the cladding can form webs and nodes of the lattice such that at least a portion of the webs have a dimension, $d_2$, and are configured as higher aspect ratio cladding material portions. In various embodiments, a portion of the webs are connected to the nodes. In various embodiments, at least a portion of the nodes can have a dimension, $d_1$, and are configured as lower aspect ratio cladding material portions. In various embodiments, the rectangular lattice can comprise 2 to 5 layers of cladding material. In various embodiments, the $D/\Lambda$ can be in a range from about 0.9 to about 0.995 and the PBGF can be configured such that $d_2/d_1$ is less than approximately 0.15. In various embodiments, $d_1/\Lambda$ can be in a range from about 0.05 to about 0.3, and the PBGF can be configured such that $\Delta\lambda/\lambda c$ is in the range from about 0.35 to about 0.85.

The method of fabricating can comprise constructing a preform by stacking capillaries and rods to form a rectangular lattice wherein the rods comprise an optical material. The method of fabricating can further drawing the preform into the PBG fiber; and controlling core and cladding pressure during drawing, wherein controlling the core and cladding pressure during drawing can relatively narrow a web dimension, $d_2$, and substantially limit relative changes in node dimension, $d_1$, of said PBGF such that $D/\Lambda$ is in a range from about 0.9 to about 0.99. In various embodiments, the core and cladding can be pressurized with different pressures. In various embodiments, the cladding holes can be pressurized from about 0.5 to about 2.5 psi and the core can be pressurized from about of 0.2 to about 2 psi. In various embodiments, the pressurization of cladding holes can exceed pressurization of the core. In various embodiments, the web dimension, $d_2$, can be less than about 0.25 μm.

BRIEF DESCRIPTION OF THE DRAWINGS

FIG. 12 is a plot illustrating an example of the relationship between the relative bandgap and the relative strut ratio ($d_2/d_1$). The insert shows labels for curves having different values of relative node size ($d_1/\Lambda$).

DETAILED DESCRIPTION

The conventional PBGF cladding structure with a hexagonal lattice has limited bandgap, which may make it difficult to increase its transmission window. An improvement in design and/or fabrication of a PBGF that may increase the transmission bandwidth while supporting low-loss single mode propagation may be desirable.

Unless otherwise stated, throughout this application transmission window generally refers to the width of a spectral transmission curve at approximately 10% of maximum intensity. In some embodiments, where a spectral passband includes significant ripple or other fluctuations, the ripple intensity may be represented by an average or median value.

Figure 1A:
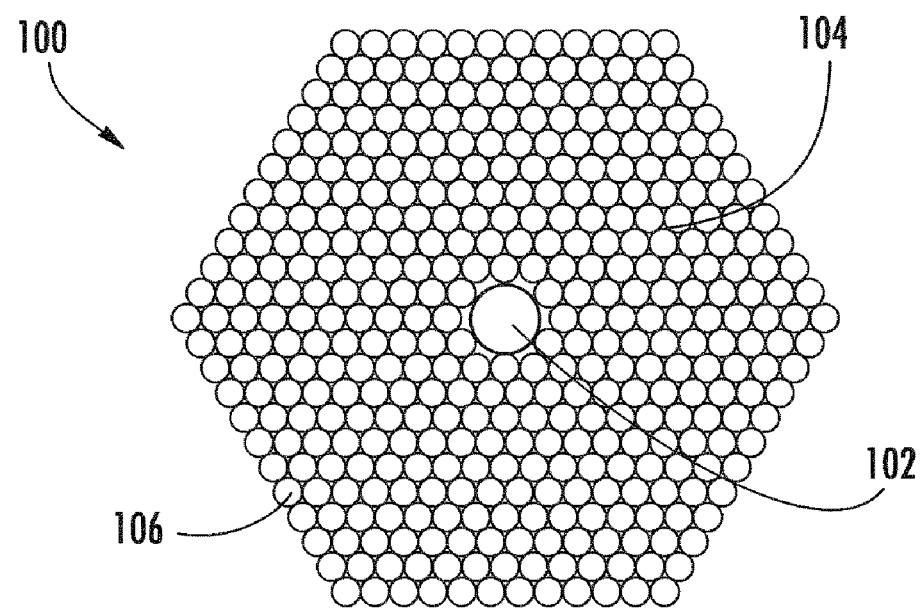
FIGS. 1A and 1B are cross-sectional views that schematically illustrate examples of the photonic band gap fibers (PB- GFs) having a hexagonal cladding fabricated from a plurality of hollow tubes with 7 and 19 tubes, respectively, removed to form a core.
Figure 1B:
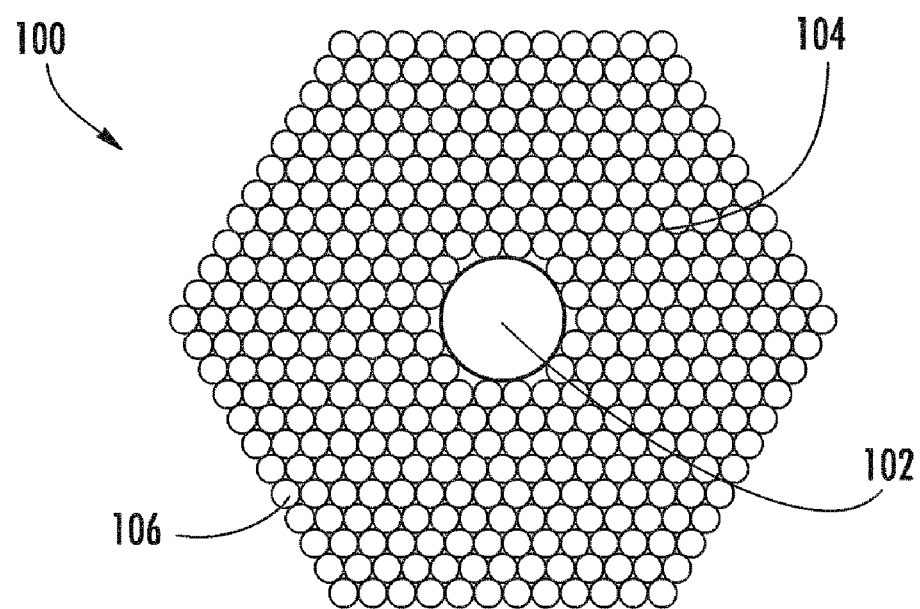

U.S. Pat. No. 7,209,619 (the '619 patent), which is incorporated herein by reference in its entirety for the subject matter specifically referred to therein and for all other subject matter it discloses, includes among the many structures described therein photonic bandgap fibers designed to provide a desired dispersion spectrum. Additionally, designs for achieving wide transmission bands and lower transmission loss are also discussed. For example, a photonic bandgap fiber (PBGF) 100 as shown in FIG. 1A was previously disclosed in the '619 patent. FIG. 1A and its related disclosure are incorporated herein by reference in its entirety. As disclosed in the '619 patent, the photonic band gap fiber (PBGF) 100 shown in FIG. 1A comprises a core 102 and a cladding 104, wherein the cladding comprising a plurality microstructures 106 arranged along hexagonally-shaped pathways about the core. Such a cladding 104 may, for example, be formed by stacking small thin wall tubes in a triangular pattern. As seen in FIG. 1A, this triangular pattern results in a hexagonal arrangement and may be referred to as hexagonal stacking as well. In some embodiments, the core 102 shown in FIG. 1A may be fabricated by excluding 7 tubes from the center of the hexagonally-shaped pathways. In FIG. 1B, the core 102 in the PBGF 100 is formed by leaving out 19 tubes resulting in a fiber with a larger core as compared to the fiber illustrated in FIG. 1B. FIG. 1B of the '619 patent and its related description is incorporated herein by reference in its entirety for the subject matter specifically referred to herein and for all other subject matter it discloses.

The fibers illustrated in FIG. 1A and FIG. 1B may be formed by drawing the tubes. Although the cladding 104 is created by stacking circular tubes, in various embodiments, the final cross-section of the fiber 100 may not contain circular holes because the interplay of surface tension and viscous flow during the drawing process may distort the circular holes. In various embodiments, the holes may be pressurized during drawing. The pressure may play a major part in determining the final hole geometry.

In various embodiments, the tubes may comprise hollow glass tubes, the glass portion comprising a relatively high index material in comparison to the hollow portion, which is empty and may be evacuated or filled with gas or air. After drawing, the glass portions fuse together forming a high index matrix having hollow regions therein. These hollow regions within the glass matrix form the microstructures 106 that provide the photonic band gap confinement of the cladding 104.

As discussed above, fibers 100 illustrated in FIG. 1A and FIG. 1B having a hexagonal arrangement are made by removing 7 or 19 tubes from the center of a hexagonal stack. Various embodiments of these fibers may exhibit a transmission window of less than 100 nm. Yet for many applications, a much wider transmission band can be useful. In various embodiments disclosed in the '619 patent, a wider transmission band or window can be achieved by reducing the thickness of the high index materials in the cladding. Additionally, transmission loss has a minimum at an optimized thickness of this high index material in the cladding. Higher leakage loss can result at very small thickness of the high index cladding material, and thus, the cladding no longer provides good confinement. A greater number of tubes or resulting microstructures can be removed from the center to provide for the desired core size. A preform comprising the plurality of tubes with many tubes in the center removed can be drawn down to provide a desired core size. The cladding dimension can be substantially reduced when drawn down to give a desired core size. Accordingly, in various embodiments of a hexagonal PBGF, the transmission band is large, while transmission loss may also be substantially reduced.

Figure 2A:
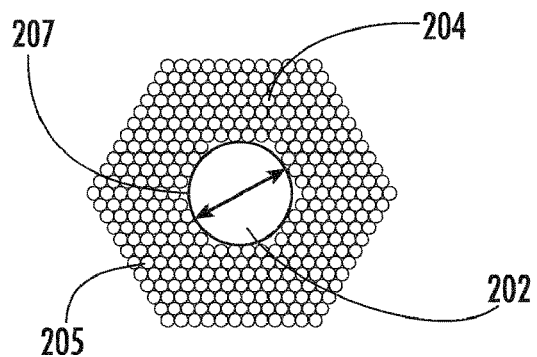
FIGS. 2A-2F are cross-sectional views that schematically illustrate examples of PBGF designs having cladding formed from hexagonally arranged microstructures that have wide transmission bandwidth and low transmission loss.

An illustration of an example of a hexagonal stacked preform is shown in FIG. 2A, comprising a core 202, a cladding 204 formed by stacking tubes 205. A core tube 207 is used to form the core 202. In this embodiment, small dimension for the high index material is achieved by leaving out much more than 19 tubes when forming the core 202 using the triangularly stacked cladding. The preform is then drawn to yield a certain core size after drawing. The cladding dimension is much reduced compared to other designs with a similar core size.

Apart from confinement loss, an additional loss mechanism in PBGF can be from the presence of surface modes around the core. Guided core modes can couple power into the surface modes. Part of this coupled power is subsequently lost. The presence of surface modes is a direct consequence of removing tubes in a regular matrix to form a core. Advantageously, however, the number of surface modes can be reduced by reducing or minimizing the width of the high index material around the core. In various embodiments disclosed in the '619 patent, the width of the core/cladding boundary is much further reduced than that of the corresponding cladding. Much stronger coupling exists between the guided core modes and these surface modes than that of the guided core modes and the modes supported in the cladding. The width reduction of the core/cladding boundary is provided by the techniques described above for reducing the width of the high index material in the cladding structure.

Figure 2B:
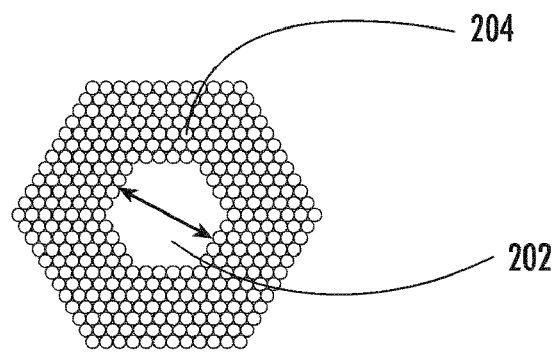
Figure 2C:
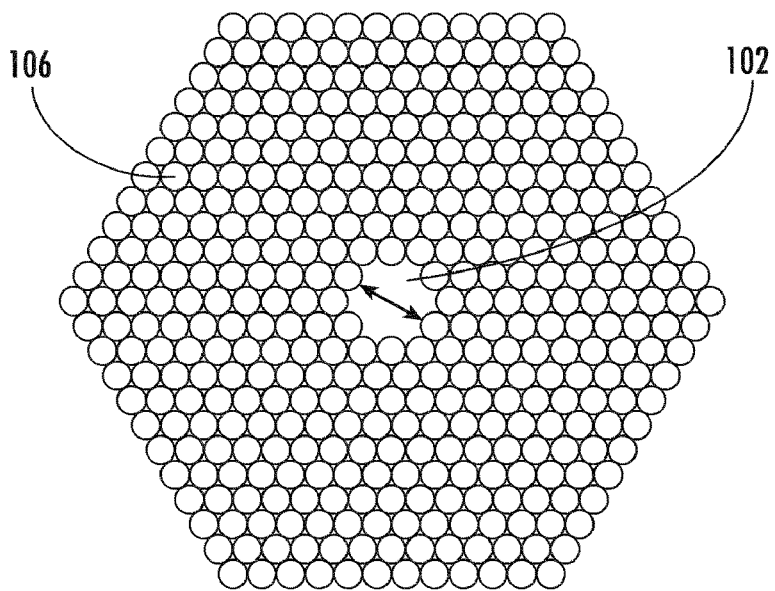
Figure 2D:
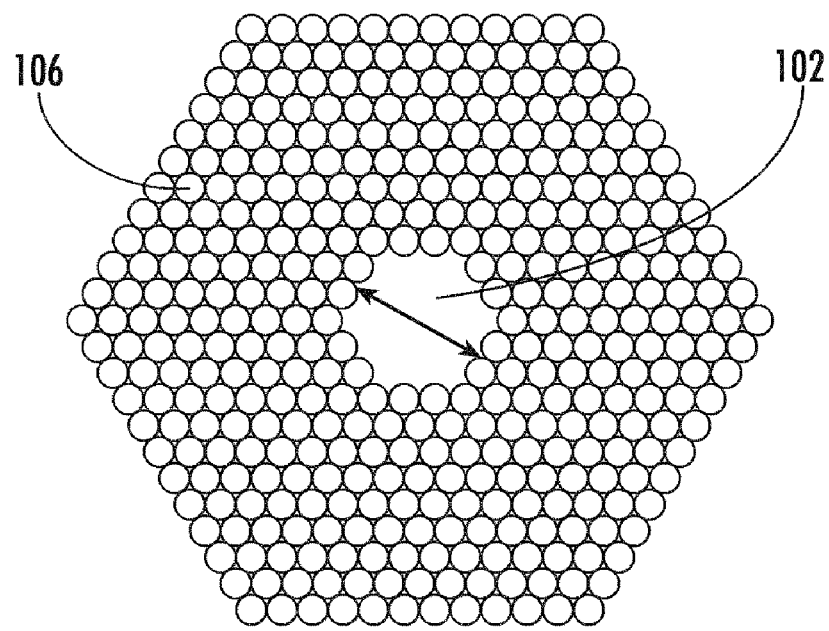

Accordingly, as disclosed in the '619 patent, some loss in PBG fibers is due to the presence of surface modes around the core and cladding interface formed by the high index material closest to the core. This high index material may comprises a layer, which may be annular or ring-shaped as seen in the cross-section such as shown in FIG. 2A. This high index material forms a high index boundary around the hollow core 202 that has a relatively low index. The high index material layer may be formed at least in part by the core tube 207. The surface modes are supported by this high index boundary around the core. As described above, these surface modes can act as leakage channels for guided core modes. The core modes can couple power into these surface modes and the power is then lost through further coupling into cladding modes or radiation modes. One method of solving this problem is to reduce the width of the high index boundary around the core. Decreasing the width of the high index boundary may be accomplished by removing the core tube 207 in FIG. 2A. The improved design is schematically illustrated in FIG. 2B, where the core tube 207 is removed to reduce the thickness of the high index boundary around the core 202. The designs in FIGS. 1A and 1B can also benefit from removing the core tubes. These resultant designs are shown in FIGS. 2C and 2D. The core/cladding can also be selectively etched.

Figure 2E:
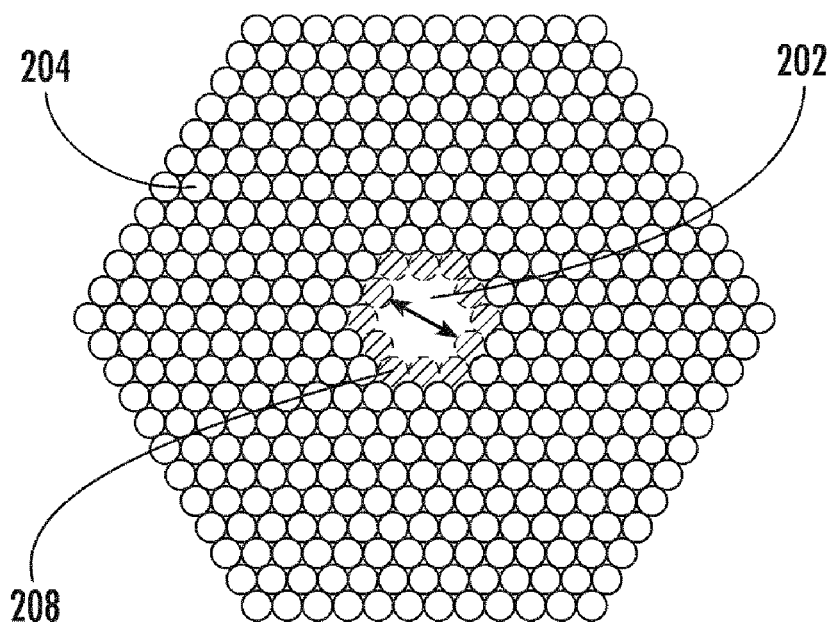
Figure 2F:
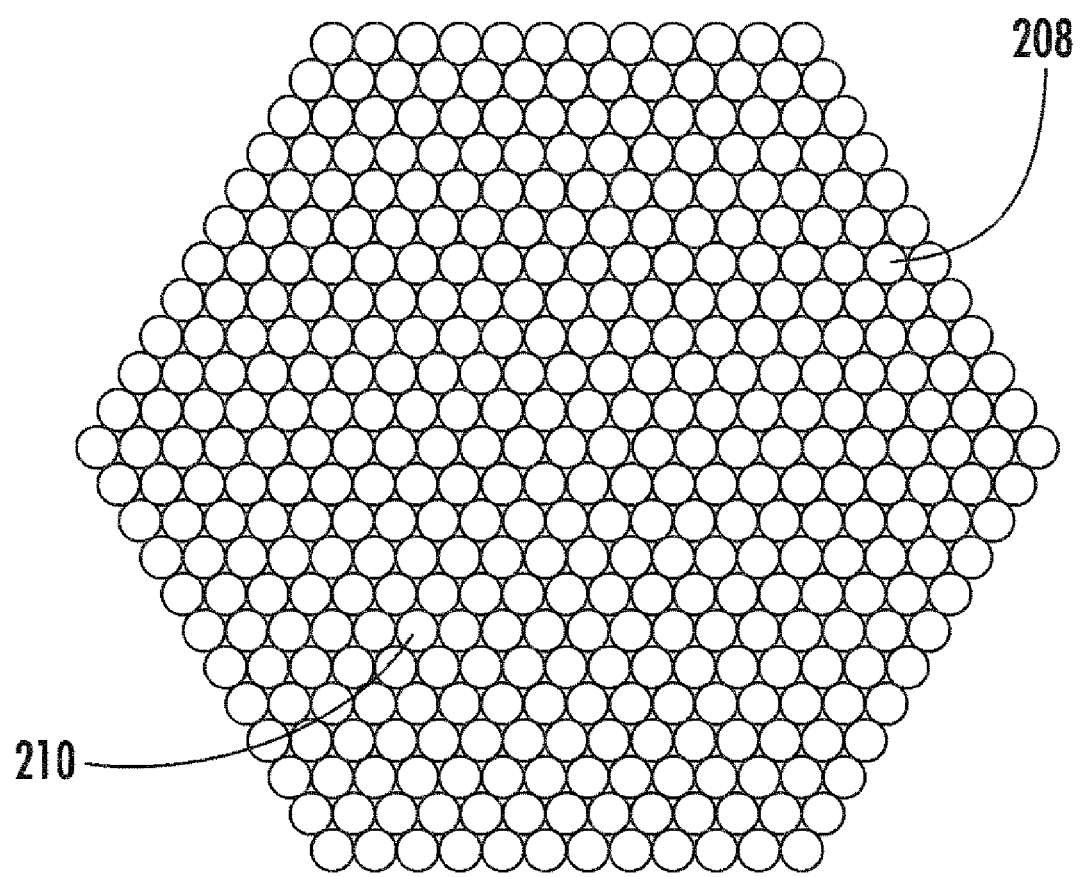

Additionally, in a construction of a hexagonal PBGF, a further step can be taken to eliminate surface modes. In this approach, a composite structure 208 is used in place of the tubes closest to the core 202 as is schematically illustrated in FIG. 2E. As shown, each of the tubes around the core is replaced with a composite tube. In this case, for example, twelve composite structures are used. An example of the composite tube or structure 208 is shown in FIG. 2F. This composite structure 208 is formed by stacking tubes 210 and then drawing the tubes down to an appropriate size to incorporate into the final preform. For example, large bundle of stacked tubes forming the composite structure are then drawn down to the same dimension as the tubes in the preform stack.

Repeated stacking and drawing can be used to further reduce the dimension of the high index material. More of the cladding tubes, especially the ones nearer to the core 202, can be replaced by the composite structure 208 to be benefited by the small dimension of the high index material. This approach thus can substantially reduce the glass dimension around the core. The general approach illustrated in FIGS. 2A-2F is not limited to triangularly stacked cladding and can be also be used in other methods of stacking. Other variations are also possible.

As disclosed in the '619 patent, circular ring-shaped regions offer some performance advantages in comparison to hexagonal ring-shaped regions illustrated in the FIGS. 2C and 2D. These advantages may include wider transmission bandwidth and lower transmission loss. Details are discussed below in connection with results of simulations of Bragg fibers. Such a Bragg fiber comprises the high and low index materials arranged in alternating concentric ring or ring-shaped regions about the core. A Bragg fiber is, however, difficult to implement when using air as the low refractive index material.

Recently a new class of hollow core fibers have been developed which relies not on photonic bandgap of the cladding for guidance, but also on a low density of modes of the cladding. This new class of hollow core fibers can provide an extremely wide transmission band, but they exhibit high loss, typically, in the few dB/m. Thus, such HC fibers are not well suited for a wide range of applications where smooth spectral transmission and low loss are important.

Hollow Core (HC) photonic bandgap fibers (PBGF) with a square lattice have received some consideration, and some advantages have been recognized. A cladding having square lattice, can advantageously provide larger nodes in the cladding and potentially much wider bandgaps. Some studies of such fibers have been performed. To fabricate fibers having a cladding with a square lattice, square stacking in preforms can be used. Recently, lossy air-core photonic crystal fibers with square lattice cladding based on low mode density in the cladding has been demonstrated. A theoretical study of fibers with square lattice cladding and experimental results obtained with fabricated embodiments of an air-core photonic bandgap fibers with a cladding of square lattice are described herein. Wider photonic bandgaps may be possible with fibers having square lattice cladding.

Various embodiments described herein comprise hollow core (HC) photonic bandgap fibers (PBGF) wherein a cladding is formed with a square lattice (SQL). As used herein, unless expressly stated otherwise, SQL fiber designs can include lattice configurations that are square (e.g., having four-fold rotational symmetry) as well as lattice configurations that are rectangular. In various embodiments, the SQL structure may have a core formed by excluding 4, 9, 16, or 25 tubes. Some aspects of hexagonal and/or Bragg fiber design and fabrication, as described in the '619 patent and above, are also applicable to SQL PBGFs. When compared to Bragg fibers, however, accurate simulation may be difficult, in part because of resolution limits and numerical round-off considerations.

Use of SQL designs and performance evaluations are not widespread. Recently, however, it was recognized that HC SQL PBGFs can have some advantages, particularly increased transmission bandwidth. As disclosed herein, in various embodiments, geometric properties of the cladding of a SQL cladding structure were used and with fabrication techniques discussed below, further extended the transmission window and decreased the loss of PBGFs relative to both hexagonal and prior SQL designs.

Figure 3A:
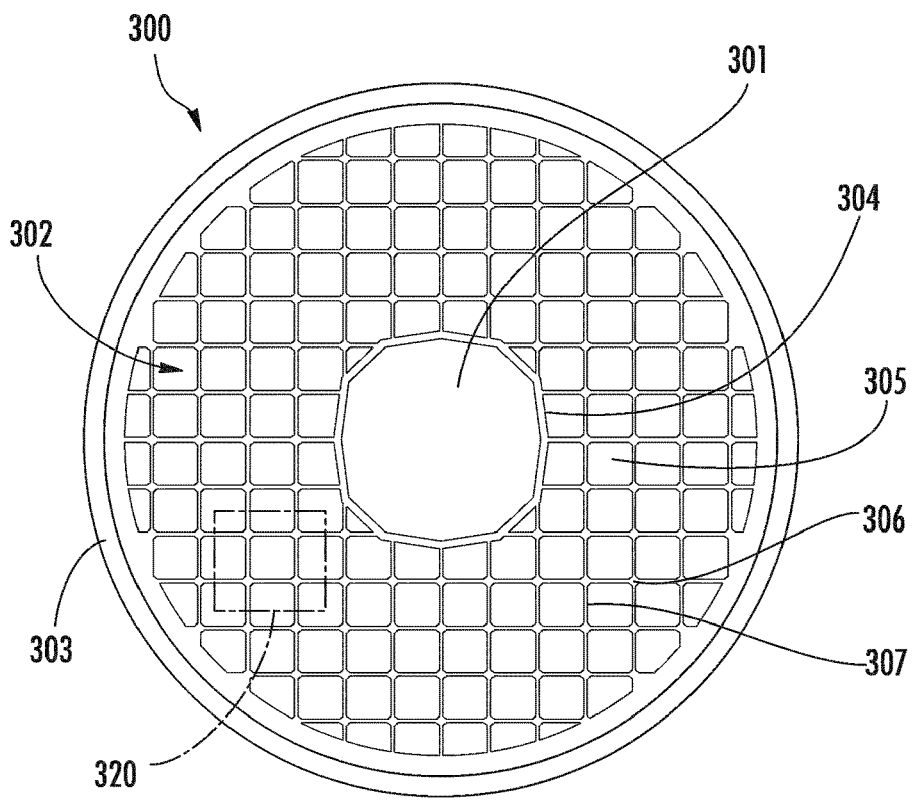
FIG. 3A is cross-sectional view that schematically illustrates an example of a hollow core (HC) photonic band gap fibers (PBGF) configured with a square lattice (SQL).

FIG. 3A schematically illustrates a cross section of a HC PBG fiber 300 with a square lattice. The fiber 300 has a core 301, a cladding area 302 with a square lattice comprising a high index glass, and an outer cladding area which may comprise a polymer coating 303. The SQL PBGF of FIG. 3A also includes core and cladding boundary 304, holes 305 at least partially surrounded by cladding material, nodes 306 and webs or struts 307 of glass material connecting adjacent nodes. In various embodiments, the glass may comprise silica.

Figure 3B:
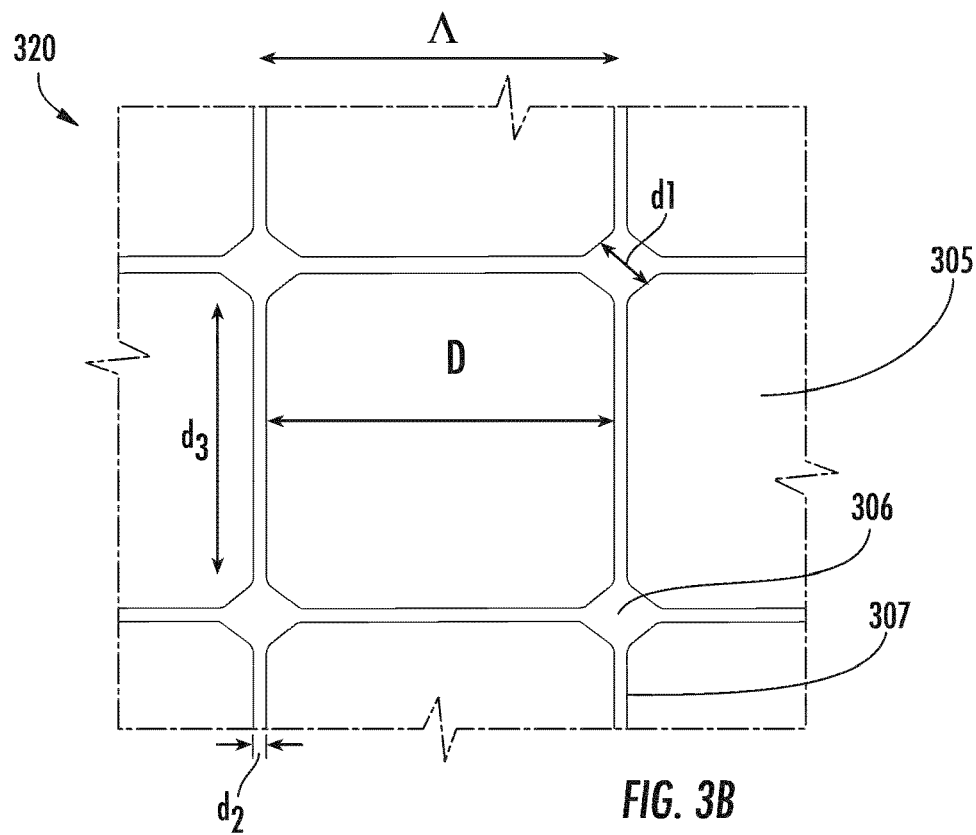
FIG. 3B is an exploded cross-sectional view of the HC SQL PBGF of FIG. 3A, and illustrates a unit cell of the SQL PBGF.

FIG. 3B is an exploded cross sectional schematic view of a portion of the fiber 320 of FIG. 3A that illustrates a region (e.g.: unit cell) of the square lattice. In this example the region is characterized with a pitch Λ that is a dimension of the lattice region, a hole dimension D, a node size $d_1$, a web or strut length $d_3$ and a web or strut width $d_2$. In this example web or strut 307 comprises an elongated, high aspect ratio, cladding material portion. In some embodiments, the length to the width ratio of the webs may be approximately 5:1. In some embodiments, a length to the width ratio ($d_3/d_2$) of the webs or struts may be approximately 10:1, 15:1, 20:1 or 25:1. The ratio D/Λ is affected by web or strut width $d_2$, and approaches unity with an exceedingly thin web or strut dimension. The ratio $d_1/Λ$ is determined at least in part by the shape of hole 305, particularly near the intersection of regions. Various ratios affect the formation of photonic bandgaps in the cladding area 302.

In various embodiments of SQL PBGFs described herein, a wider transmission band or window can be achieved by greatly reducing the thickness of the high index webs 307 while maintaining relatively large high index nodes 306 in the cladding 302. Additionally, in various embodiments, transmission loss has a minimum at an optimized structure of this high index material in the cladding. Higher leakage loss can result at very small node size of the high index cladding material, and thus, the cladding no longer provides good confinement. In various embodiments, the width of the core/cladding boundary is much further reduced than that of the corresponding node size in the cladding. Moreover, such a relative reduction of the core/cladding boundary may be beneficial in the construction of hexagonal PBGFs, or for other PBGF lattice configurations.

In various embodiments to increase transmission bandwidth and reduce transmission loss of a PBGF, the cladding lattice is formed so that nodes of appropriate dimensions can provide for significant large photonic bandgaps, while supporting webs are reduced to the extent feasible with fabrication technology, or sufficiently reduced so that they do not support any modes and/or affect modes supported by the nodes which would narrow the larger bandgap provided by the nodes. An effective way to increase photonic bandgap in the cladding is to reduce the width of high index webs of the cladding. The physical dimension of the optical material with the high refractive index is small enough so it supports few modes, with very little impact on the modes supported at the nodes, so that photonic bandgap can form over certain wavelength range.

Figure 4:
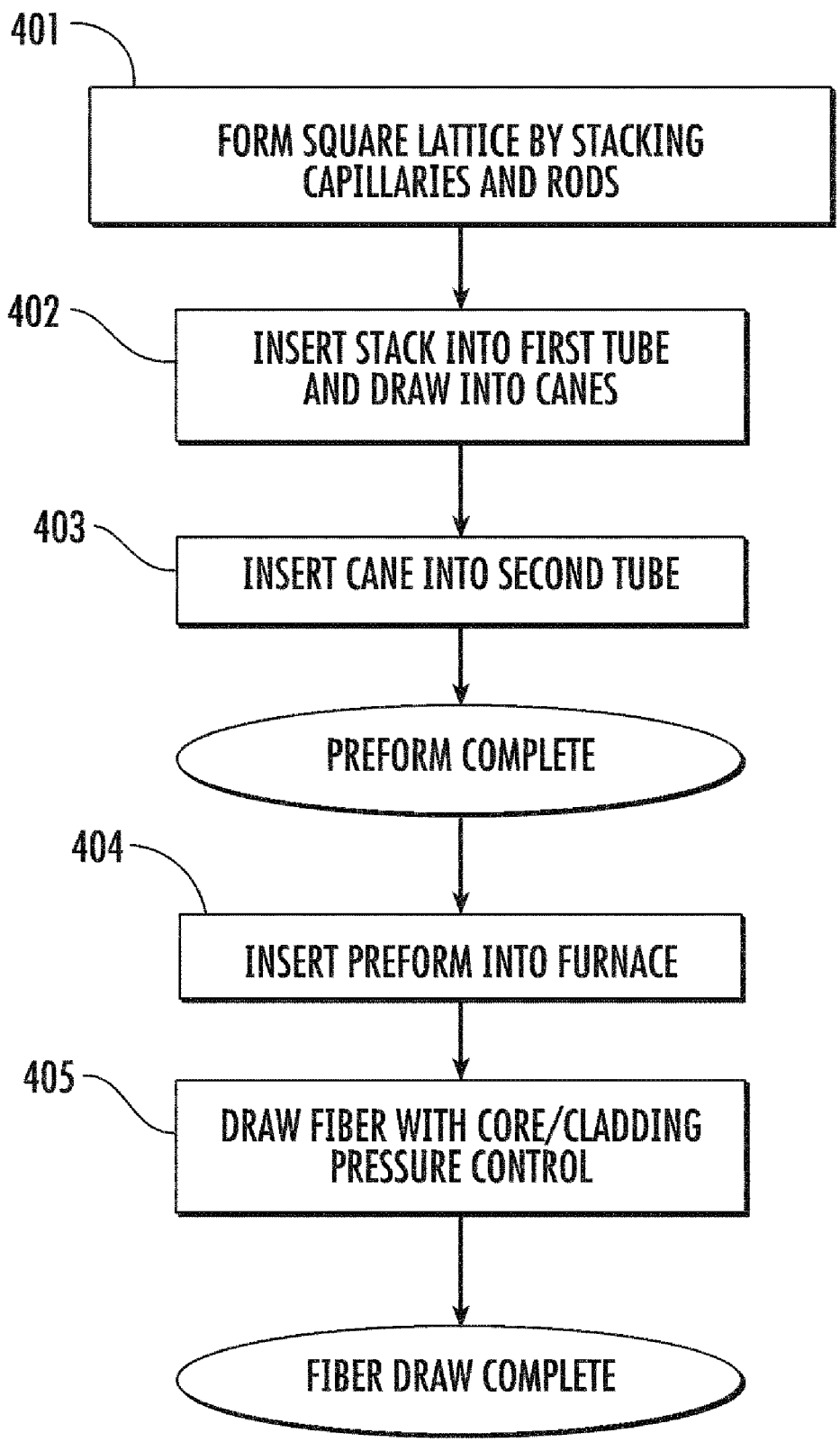
FIG. 4 is a block diagram illustrating an example of a method of fabrication for a SQL PBGF.

FIG. 4 is a schematic block diagram illustrating an example of a method of fabrication that can be used to form an embodiment of an HC SQL PBG fiber on a square lattice. A stack is first formed by stacking capillaries in a square lattice with interstitial spaces containing silica rods as illustrated in step 401. A core in the stack is formed by excluding a number of tubes. In various embodiments an optional larger core tube can also be used in place of the missing capillaries. The stack is then inserted into a first tube, and a cane is drawn of few millimeters in diameter as illustrated in step 402. In various embodiments, the cane can be approximately 1 m long. In some embodiments, the cane can be further sleeved with a silica tube to provide the correct fiber diameters for the intended core sizes. The cane is subsequently inserted into a second tube and drawn into a fiber as shown in step 403 resulting in a completed preform. In various embodiments, fibers can be drawn with separate pressures in the core and cladding. Appropriate pressures can be applied to achieve significant expansion during the draw process which can be advantageous in reducing the strut size in the final fiber. In some embodiments, pressure in the core can be as high as 1 psi while that in the cladding can be as high as 2 psi. The completed preform may be inserted into a furnace as illustrated in step 404 and a fiber having core/cladding pressure control maybe drawn as shown in step 405. In various embodiments the drawn fiber may have an outer diameter in a range from about 50 μm to about 500 μm.

Figure 5A:
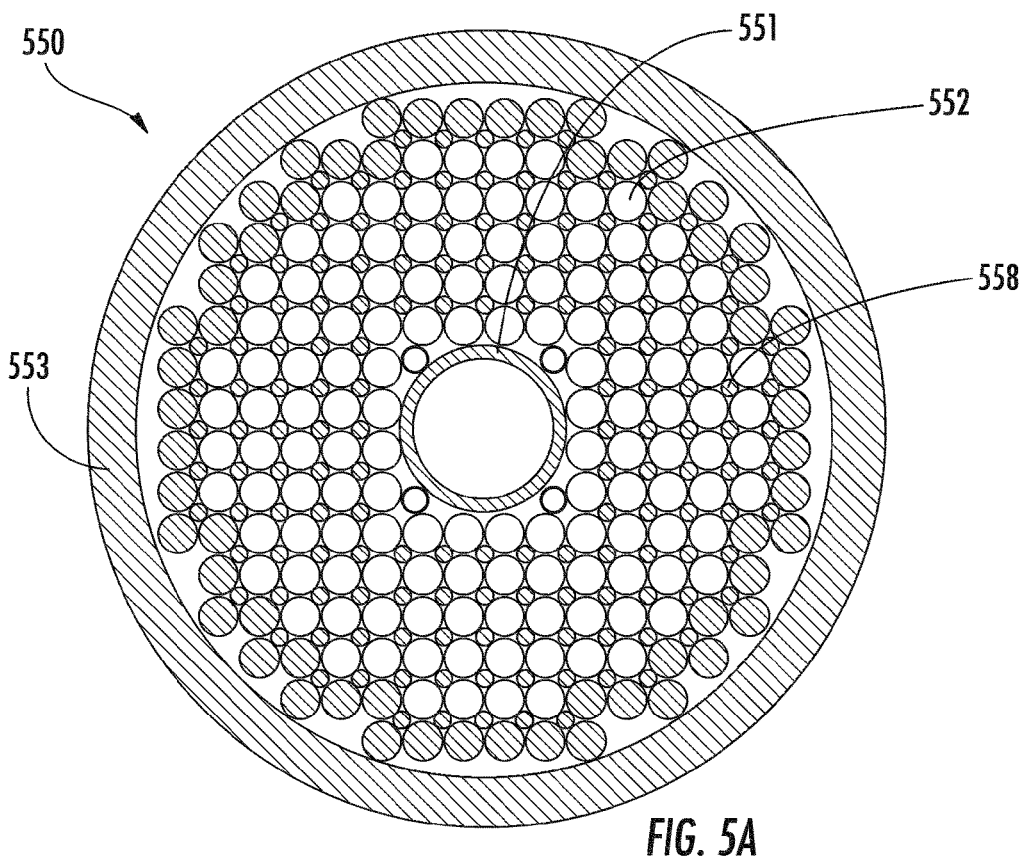
FIG. 5A schematically illustrates an example of a stack formed as a square lattice and comprising capillaries, interstitial holes filled with silica rods, and a core.

FIG. 5A schematically illustrates a stack 550 formed as a square lattice. The interstitial space between capillaries 552 includes silica rods 558. Core tube 551, adjacent spacers, and tube 553 enclose the square stack. In this embodiment, the cladding structure in cross-section comprises a two-dimensional periodic structure formed by a square stacked arrangement that forms non-hexagonal layers. The rods 558 eventually form relatively large nodes (e.g. nodes 306 in the SQL PBGF fiber 300), and the structure is beneficial in the formation of photonic bandgaps in the cladding.

Figure 5B:
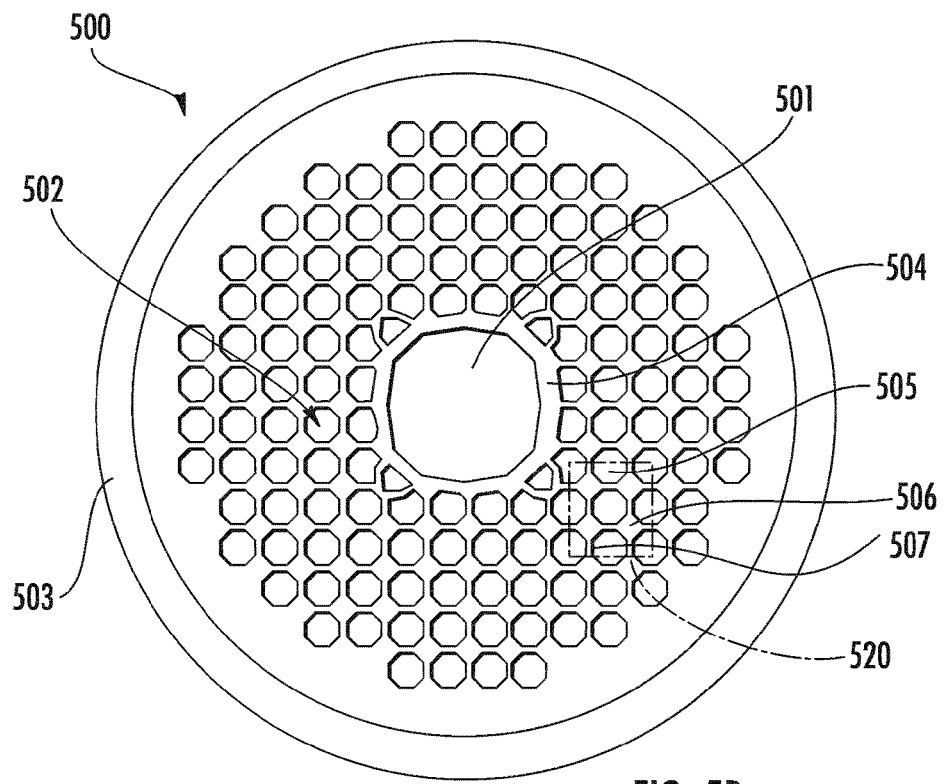
FIG. 5B is a cross-sectional view that schematically illustrates an example of a preform cane representing a SQL PBGF at an intermediate stage of fabrication.
Figure 5C:
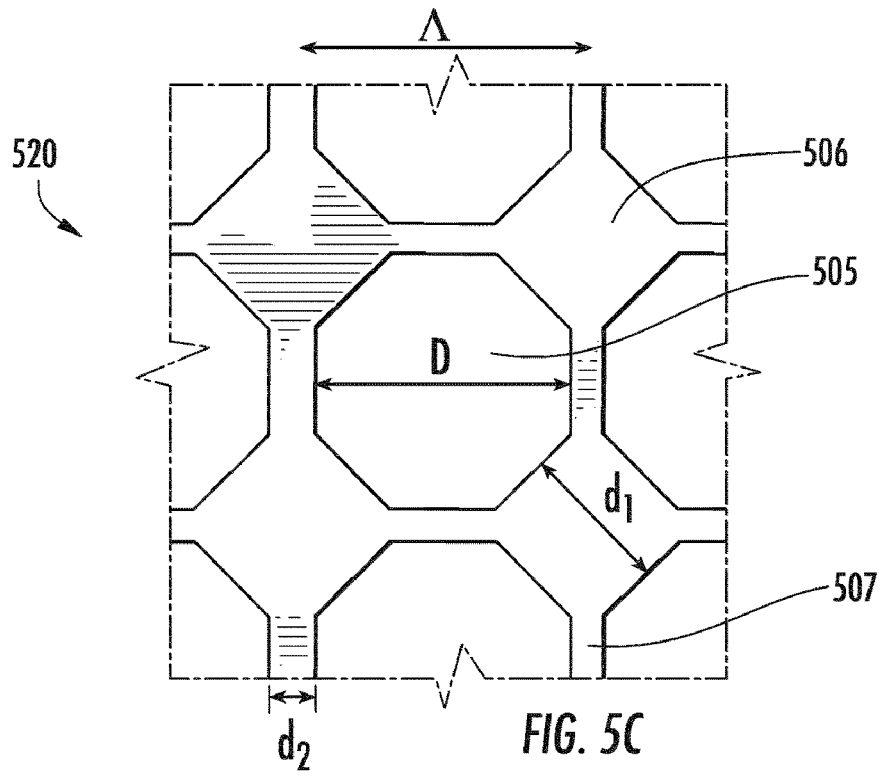
FIG. 5C is an exploded cross-sectional view of the cane schematically illustrated in FIG. 5B.

FIG. 5B schematically illustrates a cross-sectional view showing a HC SQL PBG cane at an intermediate stage of fabrication, and corresponds to a cross section image of the preform cane. Cane 500 has a core 501, a cladding area 502 with a square lattice, and an outer cladding area 503. The cane 500 also includes an air core which is formed by excluding the pre-determined number of rods from the stack. Other features include core and cladding boundary 504, holes 505, nodes 506 and webs 507. FIG. 5C is an exploded cross sectional view of region 520 of FIG. 5B. FIG. 5C further illustrates a cladding unit cell of the cane square lattice with pitch $\Lambda$, hole size D, node size $d_1$ and web or strut width $d_2$ (corresponding with the characterization of SQL PBGF 300 of FIG. 3).

Cane 500 can then be inserted into another tube which completes fabrication of the preform. By way of example, a tube with an outer diameter of 22.1 mm and inner diameter of 3.94 mm can be used. The preform can then be drawn into a fiber.

In some embodiments of a PBG SQL fiber having large transmission bandwidth, a cane 500 may be configured with cane parameters $D/\Lambda=0.86$, $d_2/\Lambda=0.14$, and $d_1/\Lambda=0.52$. In various embodiments, parameter ranges may include cane parameters in ranges such as, e.g., $D/\Lambda=0.5-0.95$, $d_2/\Lambda=0.05-0.5$, and $d_1/\Lambda=0.2-0.6$.

Figure 6:
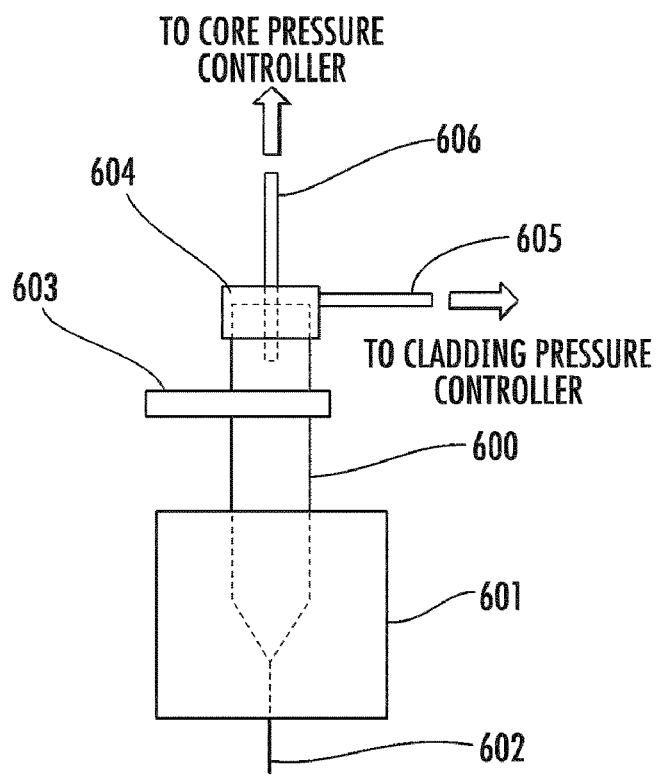
FIG. 6 schematically illustrates an example of a system for fabrication of a HC SQL PBGF.

FIG. 6 schematically illustrates a system for fabricating a HC SQL PBGF with pressurized fiber core and cladding. In various embodiments, preform 600 can be inserted in furnace 601 where it is drawn into fiber. In some embodiments, the preform 600 can be held by a preform-holder 603. A pressure adaptor 604 is installed at the top of the preform 600 where core pressure is controlled through tube 606 and cladding hole pressure is controlled through tube 605. In various embodiments Argon or Nitrogen can be used in the pressurization process.

The cladding holes and core can be pressurized differently during the fiber draw process. In various embodiments cladding holes can be pressurized to higher pressure than the core pressure. For example, in some embodiments, cladding holes are pressurized to a pressure of 1.6 psi and the core is pressurized to a pressure of 0.9 psi. In various embodiments, cladding holes can be pressurized to a pressure in the range of approximately 0.5-2.5 psi and the core is pressurized to a pressure in the range of approximately 0.2-2 psi. In various embodiments, drawing temperature can be about 1900° C. In various embodiments a drawing temperature range of approximately 1850° C. to approximately 2050° C. can be utilized. In at least one embodiment, the preform is fed at a rate of approximately 3 mm/min and a fiber is drawn at a rate of approximately 100 m/min.

Figure 7A:
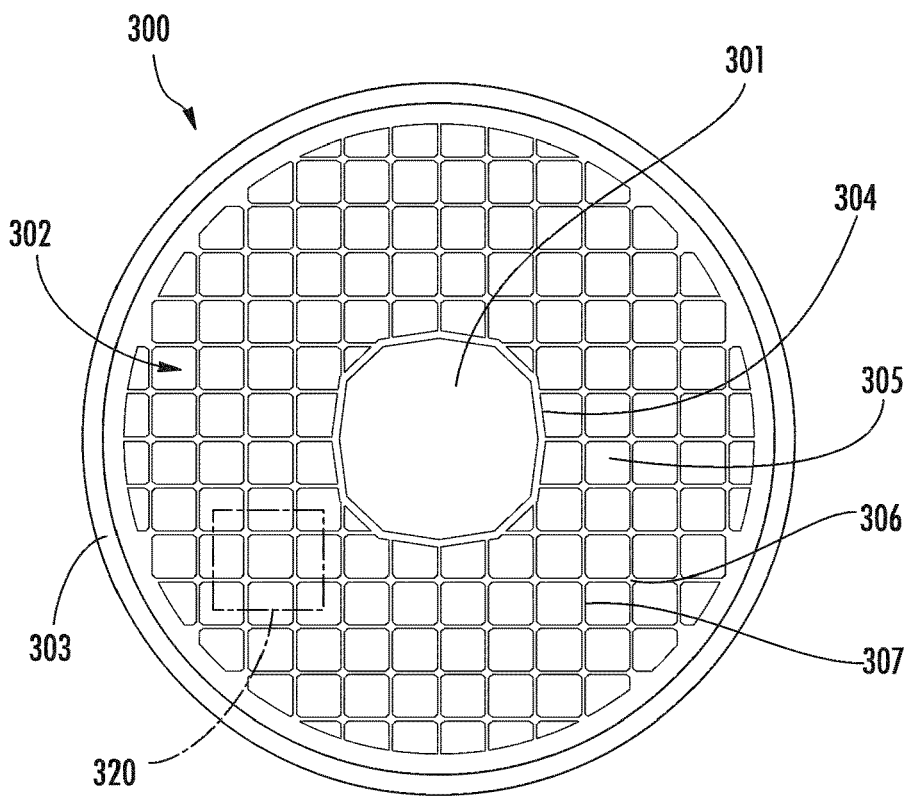
FIG. 7A is cross-sectional view that schematically illustrates an example of a hollow core (HC) photonic band gap fiber (PBGF) configured with a square lattice (SQL)
Figure 7B:
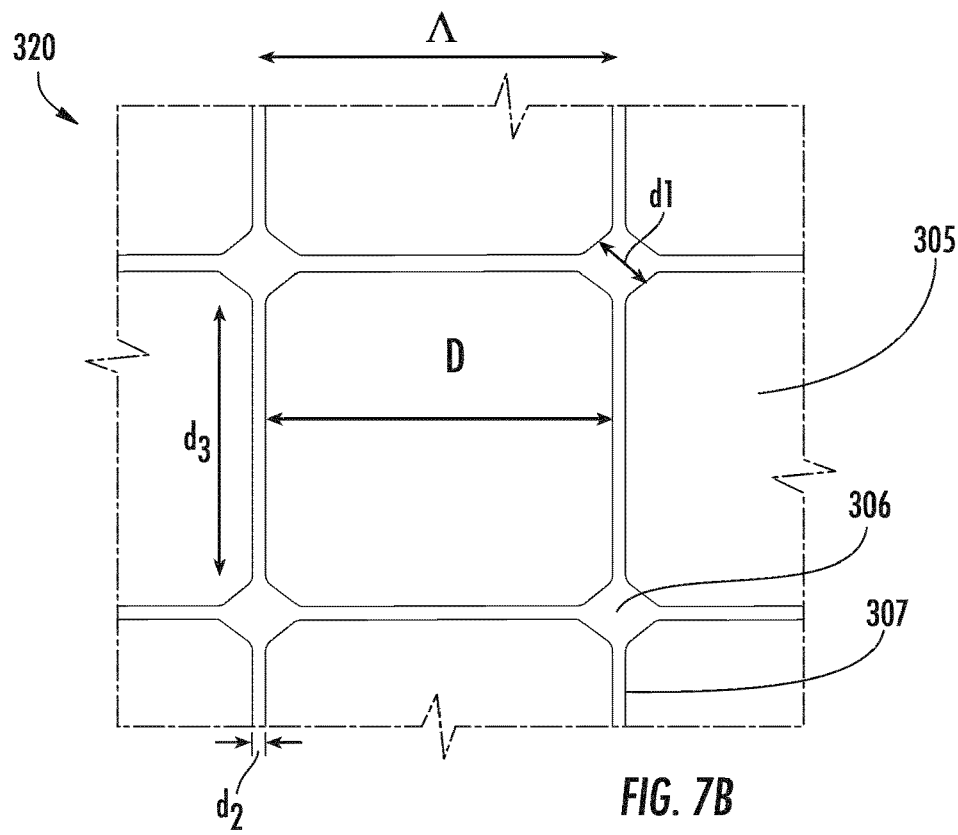
FIG. 7B is an exploded cross-sectional view of the HC SQL PBGF schematically illustrated in FIG. 7A.

FIG. 7A schematically illustrates a cross-section of completed HC PBG fiber (and corresponds to the schematic of FIG. 3A). FIG. 7B also is an exploded cross sectional view further illustrates a cladding unit cell of the square lattice and also shows pitch $\Lambda$, hole size D, node size $d_1$ and web or strut width $d_2$. When compared to the cane 500 of FIGS. 5A and 5B, the web or strut width has been reduced substantially, and as will be shown by example below, at least as a result of the differential pressure applied to the core and cladding. In various embodiments, fibers 300 may have $D/\Lambda=0.9-0.995$, $d_2/\Lambda=0.01-0.1$, and $d_1/\Lambda=0.1-0.5$.

In various embodiments a polarization maintaining (PM) HC SQL PBGF fiber may also be fabricated with a modified preform. A perfect SQL PBGF has four-fold rotational symmetry and will not be birefringent, and therefore not polarization-maintaining.

Figure 8A:
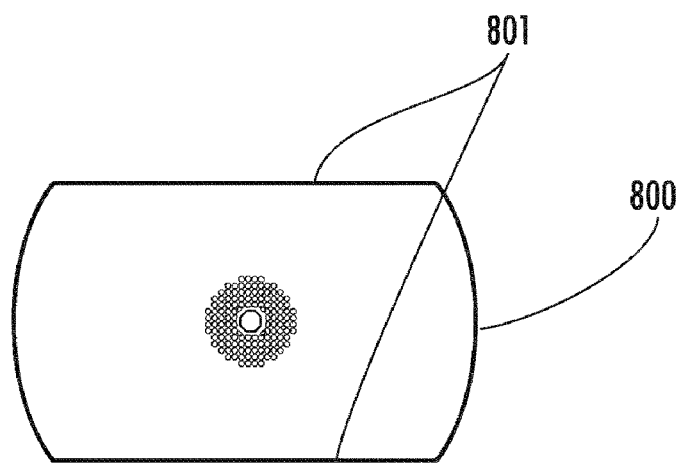
FIGS. 8A and 8B schematically illustrate examples of a construction of a SQL polarization maintaining (PM) fiber, and a corresponding preform.

In some implementations, to make a PM HC SQL PBGF the symmetry can be reduced to two-fold rotational symmetry by a technique illustrated in FIG. 8A. Two flats 801 are ground on either sides of a portion of a circular preform 800. The orientation of the flats is not critical. However, a possible orientation is along the orientation of webs or struts and at 45 degree angle to the orientation of webs or struts so that elongation of nodes can be increased. In some embodiments the flats may be oriented at other angles relative to the principal directions of the rectangular lattice. In various embodiments, when the preform is drawn, the surface tension will force the fiber outer dimension towards a circular shape. As a result, deformation of both the cladding and core of the PBGF occurs.

Figure 8B:
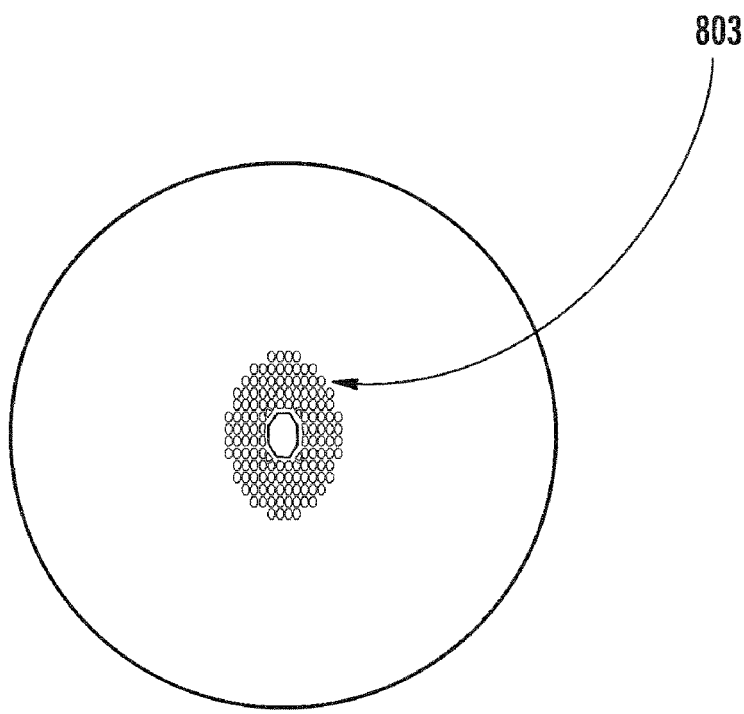

As illustrated in FIG. 8B, the fiber shape 803 is then transformed into an approximate elliptical shape with a non-circular core. The shape of the holes may also be altered, but has relatively little effect on PM and guidance. Thus, birefringence is introduced and the fiber becomes polarization maintaining. In the embodiment illustrated in FIGS. 8A and 8B, 16 excluded holes were used to form the fiber core, Also, FIG. 8B illustrates a circular outer diameter of the fiber, however, in various embodiments an elliptical shaped outer diameter may also result.

Although illustrated with a HC SQL PBGF herein, such a PM fiber fabricating technique can be adapted for construction of other PM PBGFs, and implemented for other lattice designs, such as, e.g., hexagonal lattice designs, for example the designs disclosed in the '619 patent.

Example I

Fabricated HC PBG with Rectangular Lattice

Figure 9A:
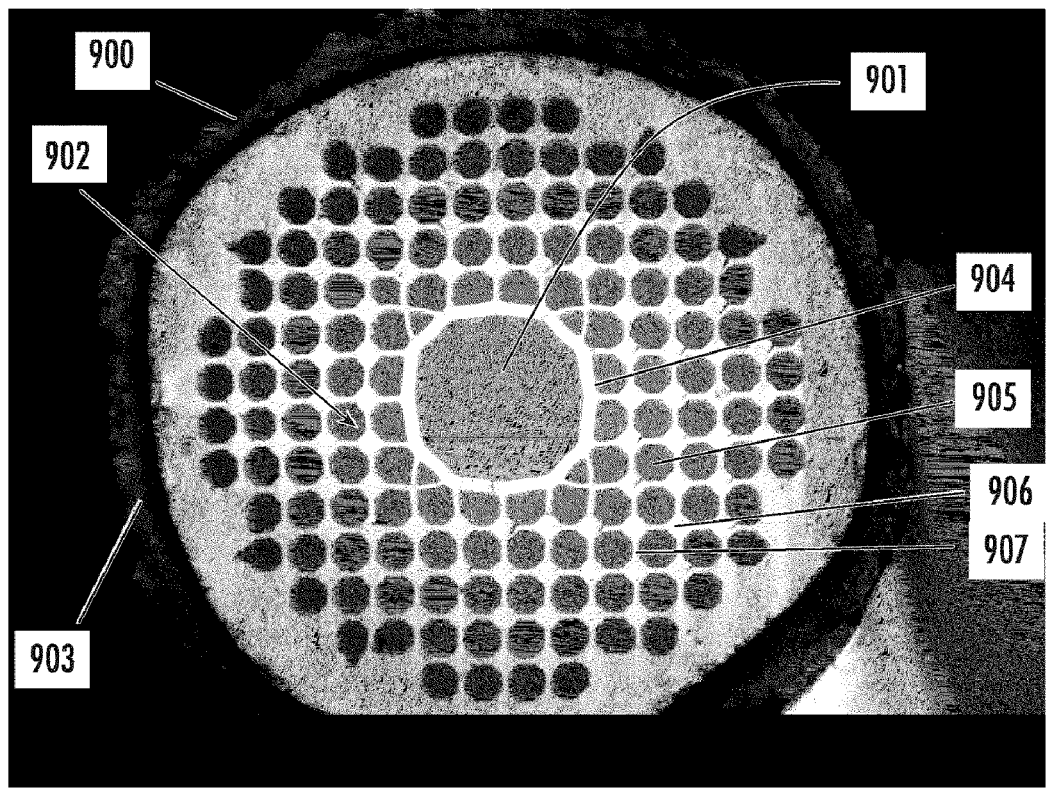
FIG. 9A illustrates an image of a fabricated preform.
Figure 9B:
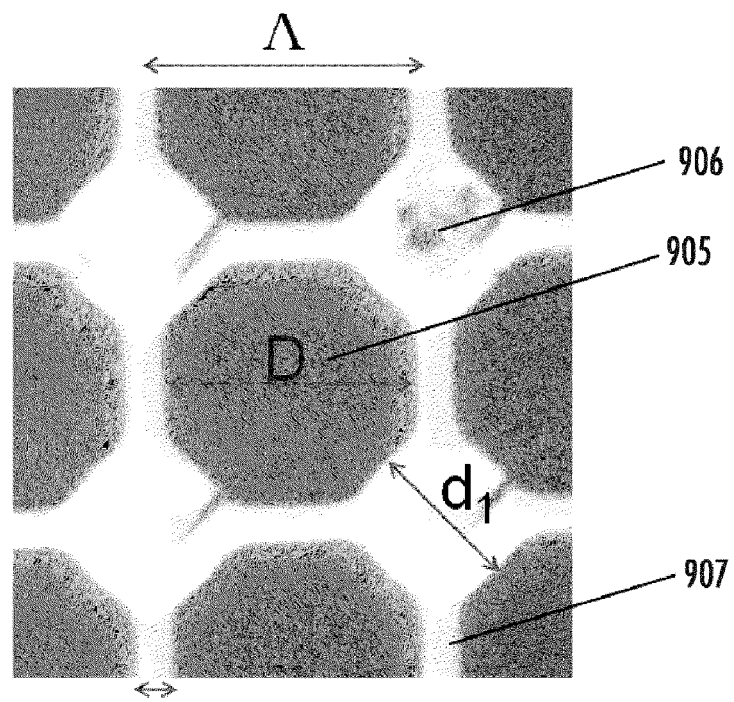
FIG. 9B illustrates an exploded region of the image of FIG. 9A.
Figure 9C:
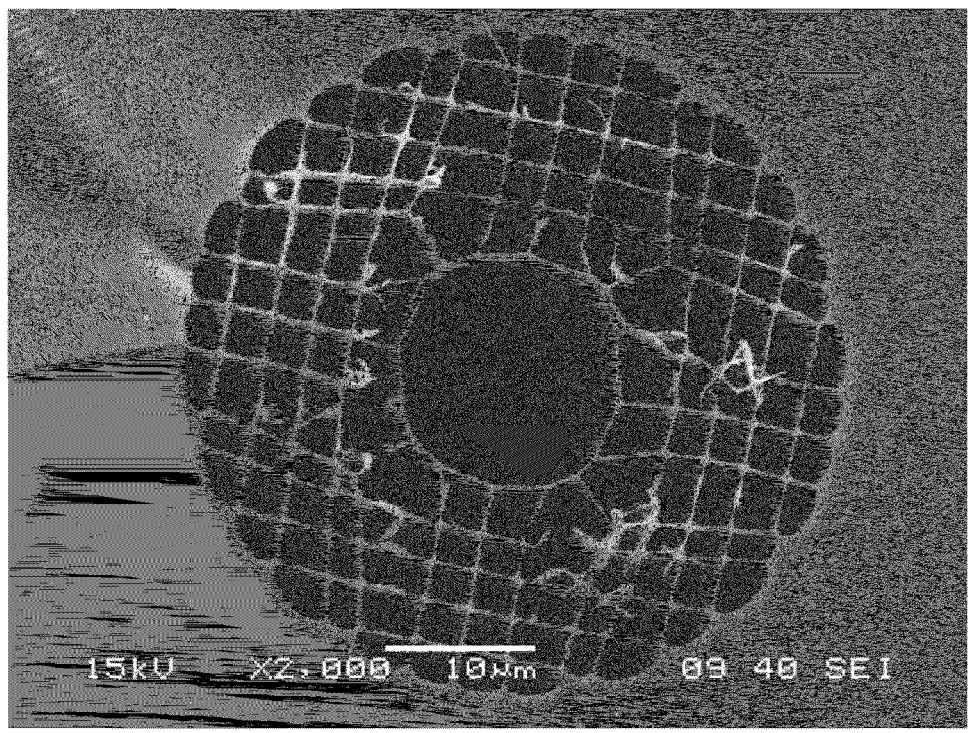
FIG. 9C is a scanning electron microscope (SEM) image illustrating a cross-sectional view of a fabricated SQL PBGF drawn using the preform of FIG. 9A.
Figure 9D:
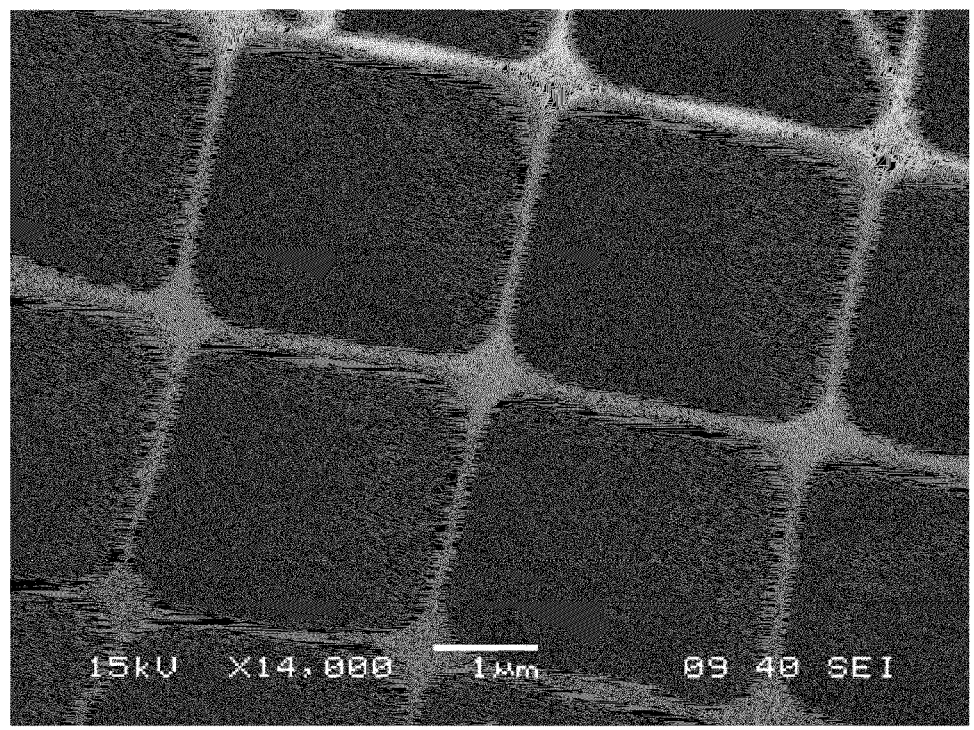
FIG. 9D is an SEM image illustrating an exploded view of the fiber illustrated in FIG. 9C.

In the example described below, a HC SQL PBGF was fabricated with fiber outer diameter of 125 µm. FIG. 9A illustrates an image of a fabricated preform 900. Features 901-905 of fabricated preform 900 correspond with 501-507 of cane 500, and eventually with 301-307 of fiber 300. FIG. 9B illustrates an exploded region of a portion of the image of FIG. 9A and shows a unit cell of preform 900. FIG. 9C is a scanning electron microscope (SEM) image illustrating a cross-sectional view of a fabricated SQL PBGF drawn using the preform of FIG. 9A. The irregularities in FIG. 9C are believed to be by-products of the cleaving process for preparing fiber end for the photos, and not defects in the PBG fiber structure. Air-filling fraction is estimated to be larger than 83% in this example. FIG. 9D is a SEM image illustrating an exploded view of the fiber illustrated in FIG. 9C, and illustrates the cladding structure of the fabricated fiber. As illustrated in the example of FIG. 9D, web or strut width $d_2$ may estimated to be about 100 nm or less, giving $d_2/\Lambda$<approximately 0.03 (implying $D/\Lambda$>approximately 0.97). Pressurization steps appear to significantly reduce the web width, as illustrated by FIGS. 9C and 9D. Another fiber (not shown) was also fabricated with an outer diameter of 118 µm, core diameter of 14.2 µm, pitch $\Lambda$ of 2.2 µm, and node size $d_1$ of 0.55 µm, giving $d_1/\Lambda=0.25$.

Figure 10:
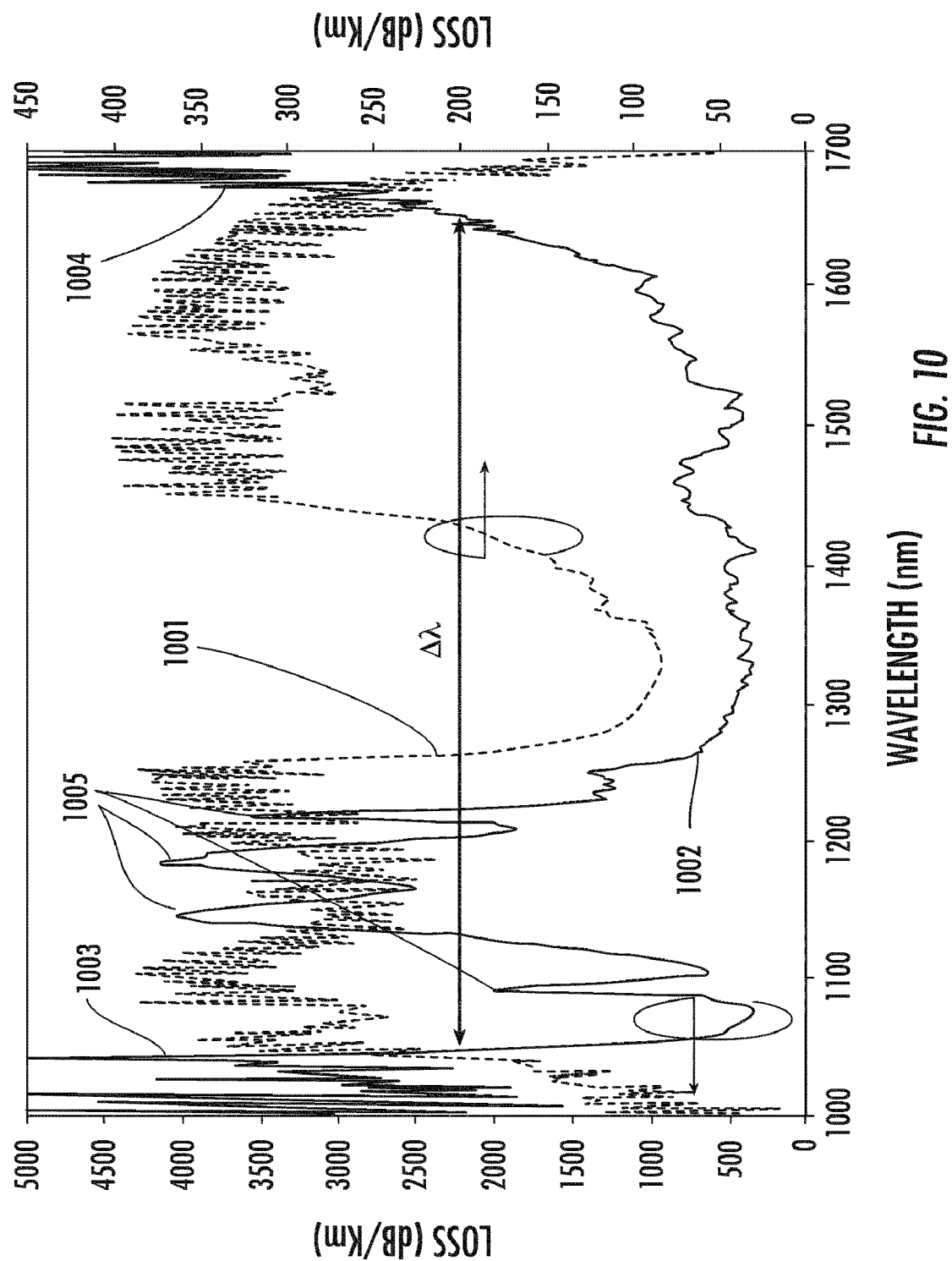
FIG. 10 is a plot illustrating measurements of the transmission bandwidth of the fabricated fiber of FIGS. 9A-9D.

Transmission of the fabricated fiber was measured, and the results are illustrated in the plot of FIG. 10. FIG. 10 shows two curves 1001 and 1002 of the loss exhibited by the fibers over a range of wavelengths. The loss values for curve 1001 are plotted on the right hand side axis while the loss values for the curve 1002 are plotted on the left hand side axis. To obtain the first measurement shown in curve 1001 a fiber of length 100 m was used and then cut back to approximately 3.5 m. To obtain the second measurement plotted in curve 1002 a fiber of length 3.5 m was measured and then cut back to approximately 1.25 m.

The second measurement reveals the cladding bandgap characterized by the short wavelength band edge 1003 and long wavelength band edge 1004. The transmission window (bandwidth $\Delta\lambda$) is characterized by the wavelength span between the two steep rising band edges as shown. As a result of the thicker core and cladding boundary used in this example, a number of surface modes are supported. Guided core mode coupling to these surface modes leads to high loss at certain wavelengths at which phase matching of the two modes occurs. Some strong loss peaks due to surface mode coupling is indicated by the peaks 1005. These loss peaks significantly reduce transmission window for long fibers. Loss due to surface modes can be reduced by using a thinner core cladding boundary as disclosed in U.S. Pat. Nos. 7,209,619 and 7,418,836, which are incorporated herein by reference in their entireties. The minimum loss measured in the first measurement as seen from FIG. 10 is approximately 85 dB/km.

In another example, a fiber with similar cross section, minimum loss of 70 dB/km was measured in a fiber with 5 rings/layers of air holes. The relative bandwidth $\Delta\lambda/\lambda_c$ was estimated to be approximately 45%.

Without being limited to or requiring any particular theory or explanation, it is believed that the use of rods 558 in the interstitial holes in the stack 550, in combination with core/cladding pressurization, reduces or minimizes web thickness, while limiting changes in the node size. The transmission bandwidth is further extended, with low transmission loss. The narrow widths $d_2$ of the webs can be appreciated from examination of the SEM image of FIG. 9D, which shows a dimension well below 1 µm, and approaching about 100 nm. A node dimension $d_1$ is about 0.5 µm.

Various embodiments of SQL fibers were fabricated using the fabrication techniques described herein. A summary of various parameters of the SQL fibers fabricated is provided in Table 1 below.

TABLE 1

Summary of parameters for various embodiments of photonic bandgap fibers with square lattice.

| Fiber No. | Cladding diameter (µm) | Core diameter (µm) | Pitch $\Lambda$ (µm) | Node Size ($d_1$) (µm) |
|---|---|---|---|---|
| 1 | 140 | 17.0 | 2.4 | 0.68 |
| 2 | 139 | 15.0 | 2.4 | 0.67 |
| 3 | 132 | 14.8 | 2.2 | 0.59 |
| 4 | 134 | 14.0 | 2.5 | 0.60 |
| 5 | 136 | 13.7 | 2.9 | 0.59 |
| 6 | 118 | 14.2 | 2.2 | 0.55 |
| 7 | 124 | 17.3 | 3.0 | 0.57 |
| 8 | 103 | 13.4-14.6 | 2.3 | 0.54 |

Figure 10A:
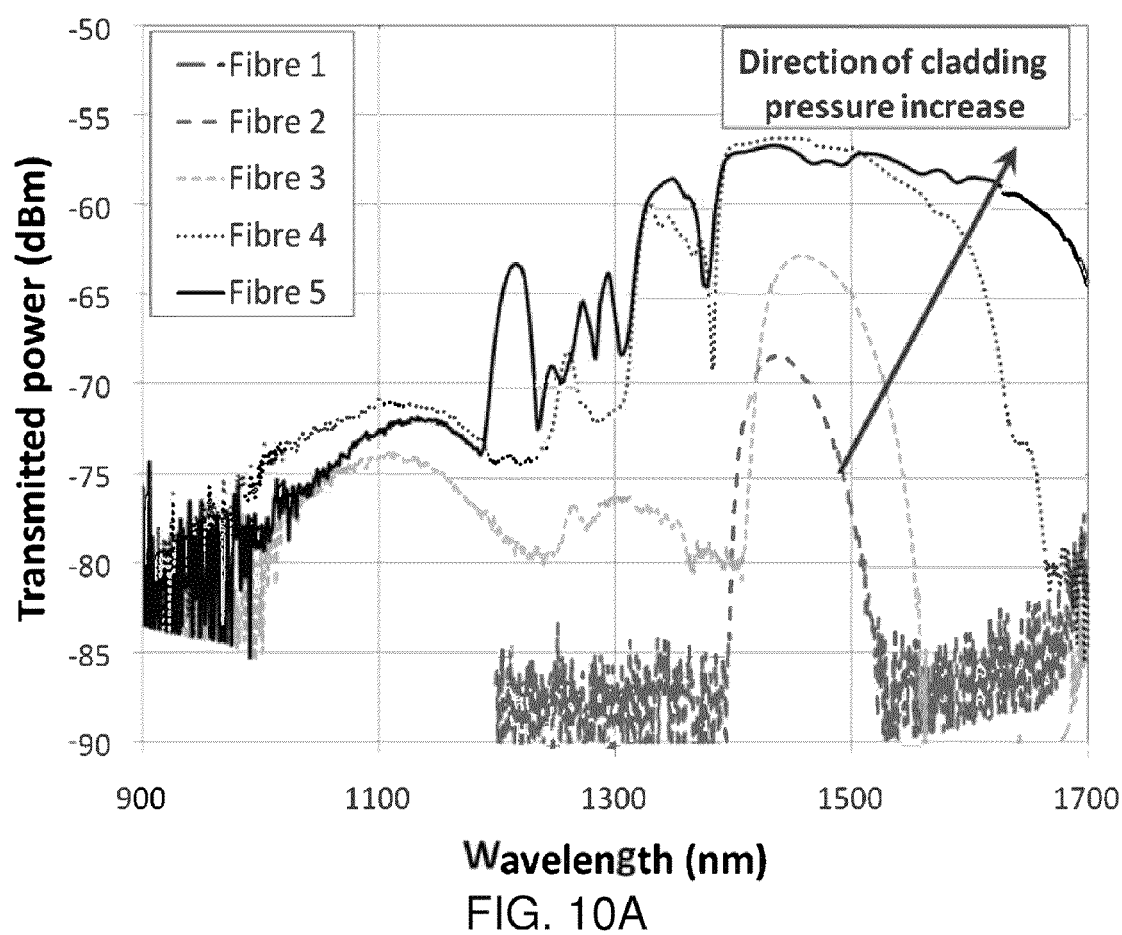
FIG. 10A is a plot illustrating the effect on transmission in embodiments of fibers fabricated using different cladding pressures.

The effect of cladding pressure on transmission of the various embodiments of photonic bandgap fibers with square lattice was studied by keeping all other drawing parameters constant in one embodiment of a fabrication technique. The effect on transmission in example fibers fabricated using different cladding pressures is shown in FIG. 10A. In FIG. 10A, the cladding pressure increases from Fiber 2 to Fiber 5. Some effects of an increase of cladding pressure in this example are thinner struts and smaller strut-to-node ratio. This has the apparent effect of extending longer wavelength (lower V value) boundary of the bandgap as shown in FIG. 10A, indicating a reduction in coupling among adjacent nodes for these example fibers.

The transmission at shorter wavelength (high V value) boundary of bandgap can also be extended, as a result of the reduction of strut size, in these examples. Some surface mode coupling can be observed near both ends of the bandgap. Without subscribing to or requiring any particular theory, this could be a result of the thick core boundary that is present in some of these fiber embodiments.

Figure 10B:
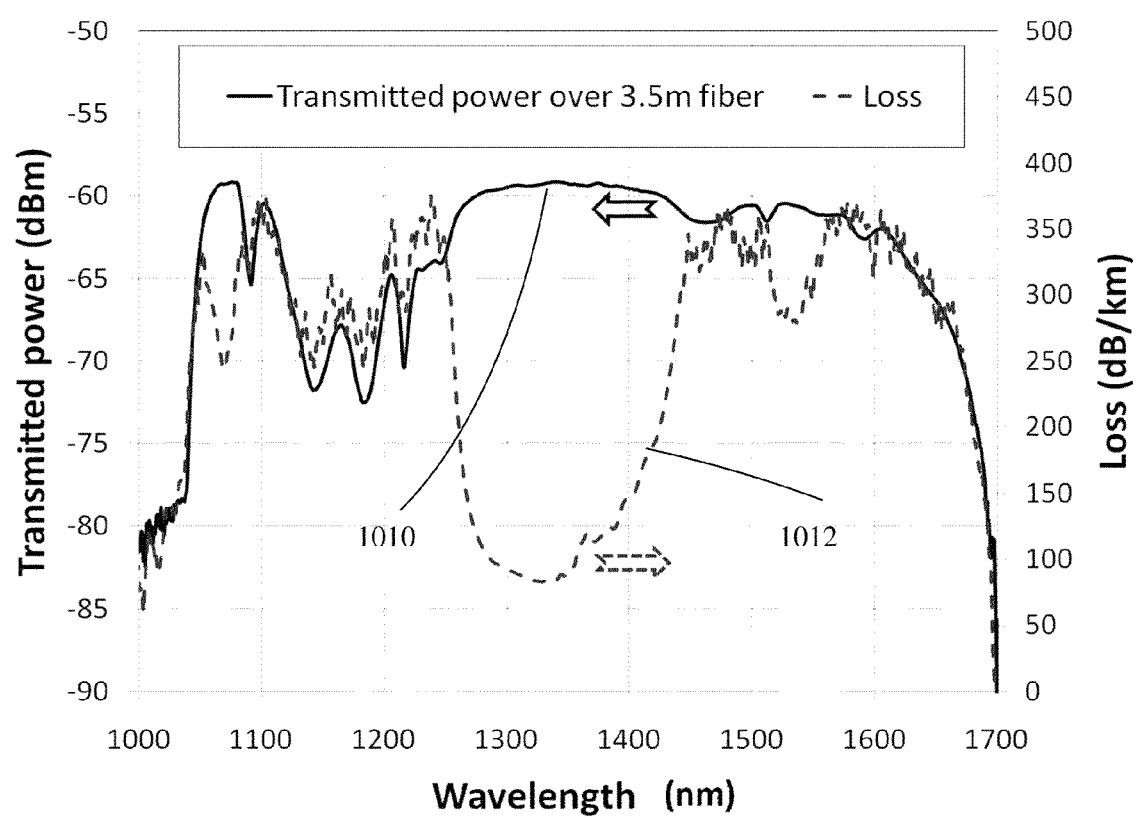
FIG. 10B illustrates the loss and transmitted power for an embodiment of an SQL PBGF.

A transmission window from about 1050 nm to about 1650 nm, 600 nm in width, and a relative bandgap of 44%, were demonstrated in a fiber having the parameters of Fiber 6 listed in Table 1. The dependence of transmitted power and loss for Fiber 6 listed in Table 1 on wavelength are shown in FIG. 10B. In various embodiments, the relative bandgap can be equal to the ratio of the transmission window and the center wavelength of the transmission window. The transmitted power over 3.5 m of Fiber 6 is shown by curve 1010 while the loss in Fiber 6 is shown by curve 1012 in FIG. 10B. In various fabrication methods, cladding and/or core pressures can be adjusted or optimized to yield fiber embodiments having various desired properties. The parameters for Fiber 6 from Table 1 are as follows: $\Lambda=2.2$ µm and $d_1=0.55$ µm for this fiber. Thus, $d_1/\Lambda=0.25$ for Fiber 6. Using $d_1/\Lambda=0.25$ and a relative bandgap of 44%, it can be estimated from FIG. 12 that the corresponding relative strut ratio $d_2/d_1$ is approximately ~0.06, resulting in a value for $d_2$ being approximately 33 nm.

Figure 10C:
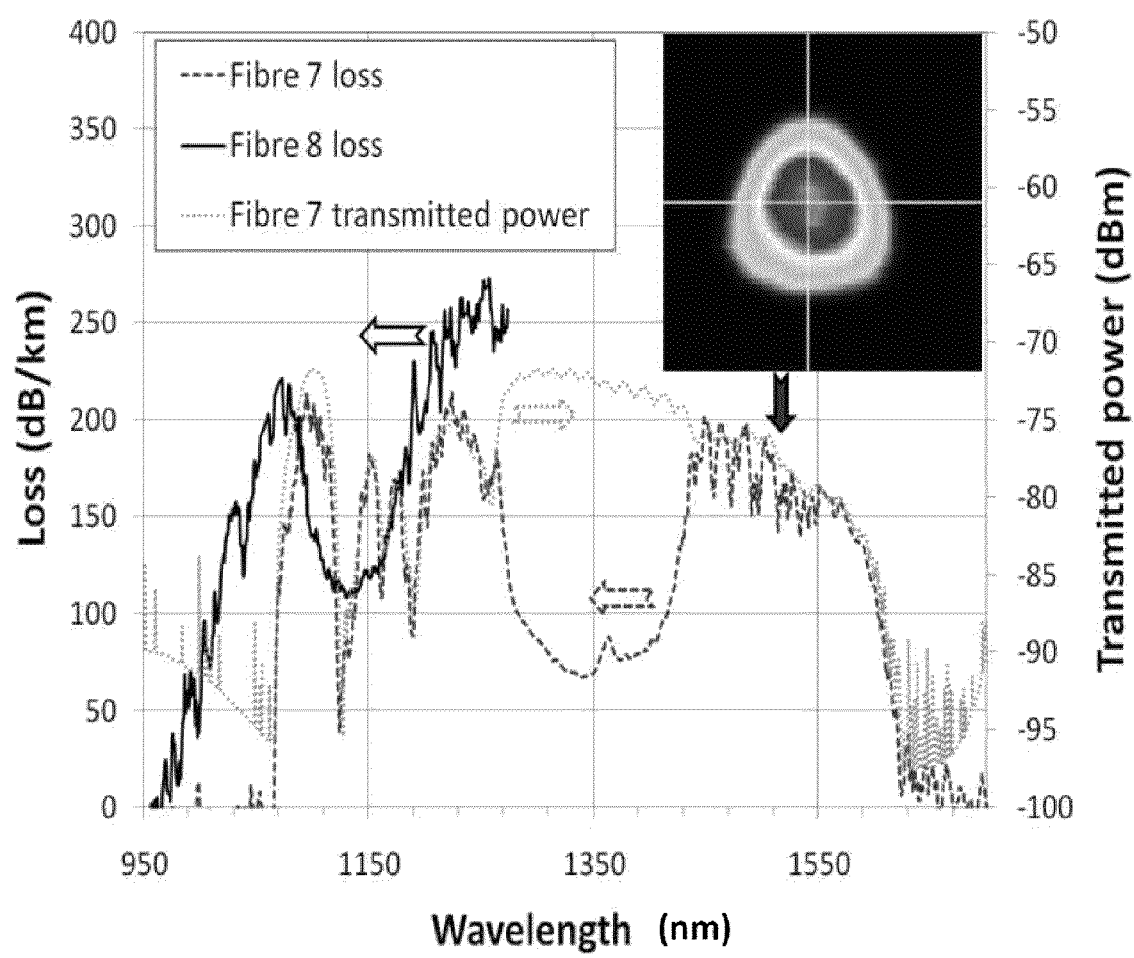
FIG. 10C illustrates the loss and transmitted power for embodiments of SQL PBGF.

FIG. 10C illustrates the variation of loss and transmitted power for a fiber having the parameters of Fiber 7 listed in Table 1 and the loss for a fiber having the parameters of Fiber 8 listed in Table 1 with respect to wavelength. The transmission was measured with cut-back method over 100 m fiber. The observed transmission is much lower than the calculated transmission probably due to additional loss mechanisms, e.g., possibly from surface mode coupling. With further elimination of surface mode coupling by a thinner core boundary, a much wider transmission window over long length of fiber is possible. Effect of fiber scaling is shown in FIG. 10C, along with mode (inset of FIG. 10C) measured at 1.5 µm at the end of a 3.5 m length of Fiber 7. FIG. 10C shows well confined core mode this far from loss minimum.

SQL PBGF Simulation Example—Parameters Influencing Relative Bandgap

PBG fiber designs may be studied using various computational models to estimate photonic states of the structure. Some models are based on numerical solutions of Maxwell's equations to determine photonic bands and bandgaps, in a manner similar to solving the Schrodinger wave equation to determine bands and electronics bandgaps in solid state physics.

In the last few years, studies of photonic bandgap fibers (PBGFs) have improved understanding of the guidance properties of photonic bandgap fibers. Without subscribing to or requiring any particular theory or understanding, several studies will be described. For example, some studies indicate that in various embodiments of PBGFs, guidance properties of PBGFs can originate from photonic bandgaps of the cladding lattice, an effect that is analogous to the observed guidance properties of anti-resonance reflecting optical waveguide (ARROW). As another example, some studies indicate that various embodiments of a photonic bandgap can be considered as an anti-resonance of the collective cladding lattice. An optical field within such a photonic bandgap is repelled from the nodes as a result of the anti-resonance, which results in confinement of the defect modes in the center of the cladding lattice. As yet another example, some studies indicate that the nature of the nodes, primarily determines guidance property of the fiber. However, in some embodiments of the PBGFs, the guidance property of the fiber the position of the nodes can have an effect in determining the photonic bandgaps. In various embodiments of the PBGFs, the defect modes are not guided modes as those in conventional optical fibers with their effective index between indexes of the core and cladding. The defect modes can be leaky modes with an effective mode index below that of the background, corresponding with the lowest material refractive index of the fiber. In some embodiments, the defect modes can be lossy at cut-off frequencies of modes in the cladding lattice of nodes.

Several numerical approaches to identify the photonic bandgaps in PBGFs have been described. For example, in one numerical approach, the relevant modes of the cladding lattice are identified and characterized. Photonic bandgaps can be described and/or identified by the regions where cladding modes are absent. As an example, for air-core photonic bandgap fibers, a mode solver capable of finding mode solutions for a unit cell with appropriate boundary conditions can be used to identify the cladding modes. Subsequently, the cladding mode density can be calculated and plotted to define photonic bandgaps. In various embodiments, it may not be required to find all the cladding modes, instead it may be possible to determine a certain sufficient number of modes to define the boundaries of the bands of modes in the cladding lattice.

As an example, in a recent study a simple cladding lattice of circular high index nodes placed hexagonally in a uniform background glass was modeled. A further approximation was obtained by using a circular boundary for the hexagonal unit cell boundary. The study observed that each mode of the original node in isolation broadens to a band of modes in a lattice of infinite nodes and the bandwidth of each band at any fixed frequency increases with a decrease of optical frequency. Furthermore, the study pointed out the conditions for the upper and lower boundary of each band is characterized by bonded states between adjacent nodes. Such states have the same phase across a cell boundary, and a derivative of the transverse field going to zero at the boundary). Additionally, the study indicated existence of anti-bonded states corresponding to a $\pi$ phase across cell boundary, with the transverse field vanishing at the boundary.

Another study disclosed a computational approach of intermediate complexity to estimate the band structure of a hexagonal lattice PBGF. A unit cell of the PBGF contained a high index rod surrounded by a lower index region. A circular symmetric approximation to the hexagonal cell provided a sufficient approximation for estimation of the band structure. The results obtained by the computational approach corresponded closely with calculations using an exact numerical method. The technique was extendable to more general radial index distributions, for example gradient index distributions. Thus, considerable information and guidance regarding PBGFs designs may be obtained from simplified computational models.

Simulations performed for various embodiments of SQL PBGFs are described herein to provide guidance for wideband SQL PBGF designs. Of considerable interest are factors which distinguish the guidance properties and bandgap structures of SQL PBGFs relative to those of hexagonal lattice PBGFs.

A computational model using commercial COMSOL, Inc. (Burlington, Mass.) finite element analysis software was developed to simulate and estimate the waveguide cladding modes. In one embodiment, appropriate boundary conditions of perfect electric conductor (PEC) or perfect magnetic conductor (PMC) were used. In one embodiment, simulations were performed assuming homogeneous and isotopic medium of the SQL PBGF while other parameters of the simulation were unconstrained. For example, in some embodiments, for computational purposes it was assumed that the medium may be both non-linear and dispersive. In one embodiment of the simulation, for each mode appropriate boundary conditions are applied and the effective modal index is computed. For example, certain modes may have transverse amplitude profiles which are both continuous at the interface, and have a vanishing derivative. With the use of COMSOL, vector solutions may be obtained in both 2D and 3D, and without the constraints associated with the scalar field. The solutions provided by the model lead to bandgap diagrams identifying forbidden states and/or allowed cladding modes.

As to conformance of the model to a fabricated structure, it has been recognized that band structures can be computed and show agreement with experimental results for photonic crystals as shown in another recent study.

In general to determine the bandgap, it may be sufficient to find the upper and lower band boundaries. In the case of square lattice, the modes defining the upper and lower boundaries can have field orientations either perpendicular or parallel to the unit cell boundary, although this property of the modes is not necessarily true near the nodes for these modes. For example, such deviation can be seen in the insets of FIG. 11A for the two modes in the fundamental mode band. To identify and/or determine these modes a numerical approach can be used such as, e.g., a Finite Element Method (FEM) mode solver from COMSOL, Inc. (Burlington, Mass.). For example, in one approach if the boundary conditions and other characteristics of the modes that need to be identified and/or determined are known then using perfect electric conductor (PEC) at one parallel pair of the cell boundaries and perfect magnetic conductor (PMC) at the other pair of parallel cell boundaries can account for all the cases where the field orientation is either perpendicular or parallel to the cell boundaries.

Figure 11A:
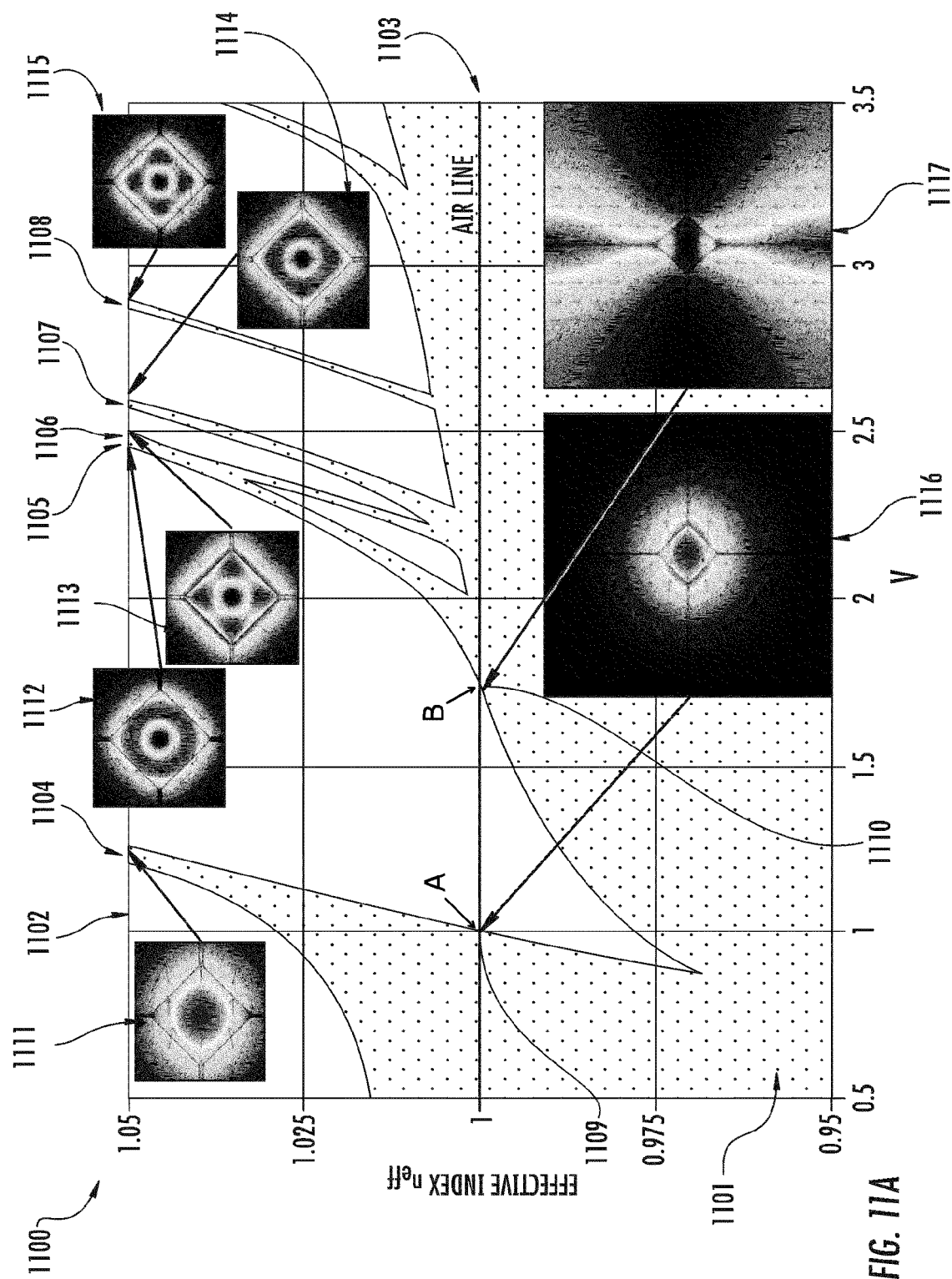
FIG. 11A is a plot showing calculated mode density and bandgap regions for an embodiment of a square lattice, photonic band gap fiber (SQL PBGF).
Figure 11B:
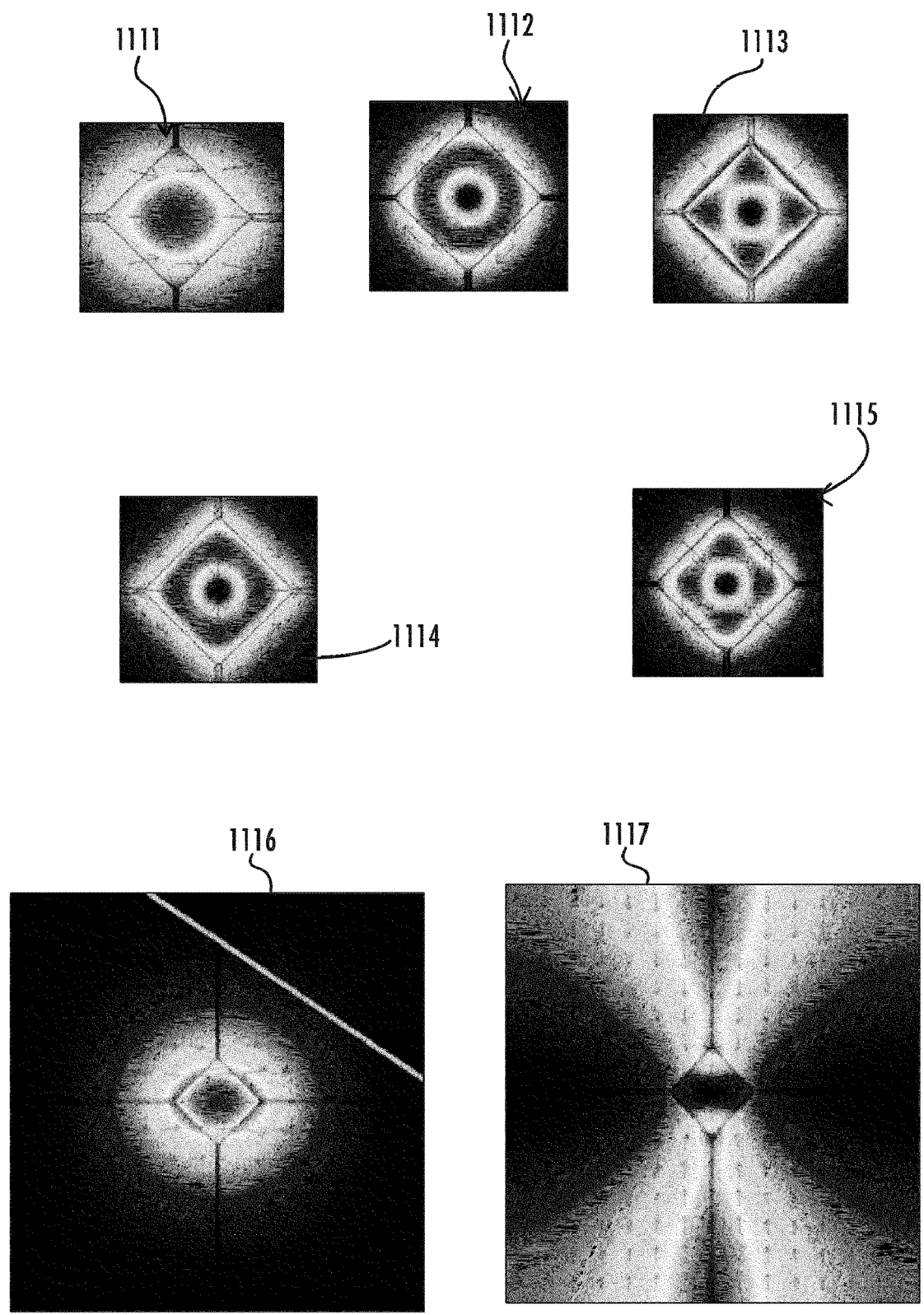
FIG. 11B illustrates expanded views of the mode profiles shown in the inset of FIG. 11A.

FIG. 11A is a plot showing calculated mode density and bandgap regions for an embodiment of a square lattice, photonic band gap fiber (SQL PBGF) with $\Lambda=5$ μm, $d_1=750$ nm and $d_2=37.5$ nm. In this example the relative node size $d_1/\Lambda$ is approximately 0.15 and the relative strut ratio $d_2/d_1$ is approximately 0.05. FIG. 11B illustrates an expanded view of the corresponding mode profiles. The states of SQL PBGF modes can be estimated for effective index values as shown. However, the bandgap structure identifying forbidden states and the corresponding gap edges are of significant interest, and correspond to "gap maps" as discussed prior studies. In carrying out the computations, a-priori information of modal properties can be used to reduce computation time so as to identify specific regions of interest.

By way of example, and referring back to FIG. 11A, the horizontal axis is the normalized frequency of the node or the fiber V parameter and is calculated by the equation $V=2\pi d_1 (n_h^2-n_l^2)^{1/2}/\lambda$ where $n_h$ and $n_l$ are refractive index of the node/web and hole respectively. Using the normalized frequency of the node as the horizontal axis may be advantageous in those embodiments where node guidance plays a significant role in determining the band diagram. In various embodiments, $n_h$ can be the similar to the refractive index of silica while $n_l$ is similar to the refractive index of air. The vertical axis represents the estimated effective mode index using the finite element model described above. A region 1101 of high mode density is shown, whereas 1102 is representative of the bandgap where propagating waves are forbidden.

In this example, $n_h$=1.445 for silica and $n_l$=1 for are air holes. When the effective mode index $n_{eff}$>1, modes are increasingly confined to the nodes, forming well defined narrow bands 1104, 1105, 1106, 1107 and 1108. The intensity distribution of these modes at $n_{eff}$ approximately equal to 1.05 is illustrated in 1111, 1112, 1113, 1114 and 1115. The band 1104 is formed by the fundamental mode of the nodes, the mode having the highest effective index, guided in the nodes while bands 1105, 1106, 1107 and 1108 are formed by the higher order modes guided in the nodes. Each band widens as V decreases due to the increasing coupling between adjacent nodes.

With a HC PBGF, the guided modes in the core have an effective index close to the air line indicated by 1103 with $n_{eff}$=1. The lower boundary of the bandgap 1109, as indicates by A, occurs at $V=V_A$ where the first band intersects the air line. The upper boundary of the bandgap 1110, indicated by B, occurs at $V=V_B$ where the second band intersects the air line. The photonic bandgap is between points A and B for this lattice and a relative bandgap size is given by $2(V_B-V_A)/(V_A+V_B)$. Mode intensity distribution at A and B are illustrated by 1116 and 1117 respectively. With detailed examination, it can be seen that the intensity distribution of mode at lower boundary A has reduced peak intensity and a broader central lobe, and is weakly confined at the node. The mode at the upper boundary B is mostly guided in the web. Without subscribing to or requiring any particular theory, the defect modes guided in the core typically have an effective mode index close to the air line. In this example, this is may be true for core diameters that are greater than the wavelength of light.

For some air-core photonic bandgap fibers (PBGFs), the existence of the struts in addition to nodes can create additional modes supported by the network of struts. As a consequence of the struts, the weaker higher order bandgaps that may exist in a lattice of just nodes may disappear. Referring to the example shown in FIG. 11A, the first band of modes at the lower V value can be derived from the fundamental mode of each isolated node. In various embodiments, this band can move towards lower index and widen at smaller V value. One of the possible reasons for this effect could be that these modes generally become less confined to the nodes at smaller V values. The reduction in confinement can also lead to stronger coupling among adjacent nodes and consequently widen this band of modes. An example of a mode at the high V value end of this band is illustrated in the top-left inset 1111 of FIG. 11A. The lower boundary of the bandgap, in particular point A, is determined by the lower boundary of this first band of modes (the mode at point A is also shown in the inset 1116 of FIG. 11A). The upper boundary of the bandgap in this air-core photonic bandgap fiber, point B, is no longer determined by the upper boundary of the second band of modes as in a lattice of just nodes without struts, but determined by the modes mostly confined to the network of struts (for example, see the inset 1117 of FIG. 11A). Also illustrated are examples of four modes 1112-1115 from the group comprising four bands of modes. In some all-solid photonic bandgap fiber with weak guidance where scalar model applies, these four bands of modes can converge into a single band of modes, which can be viewed as derivatives of the LP11 mode of each isolated node.

To increase and/or maximize photonic bandgaps in embodiments of air-core photonic bandgap fibers, it can be advantageous to move point A towards lower V value and point B towards higher V value. In some embodiments, a reduction of coupling between nodes can effectively reduce the width of the 1$^{st}$ band of modes and consequently move A towards lower V. A possible approach to move point A towards lower V can be to increase the node separation $\Lambda$, corresponding to a reduction of relative node size $d_1/\Lambda$. A possible approach to move B towards higher V value can be to reduce the effective mode indices of modes confined to the network of struts so that their guidance can be weakened. This effect can also be achieved by, for example, a reduction of relative strut width $d_2/\Lambda$. Other approaches are possible.

Without subscribing to or requiring any particular theory, the results provide guidance for obtaining an increase in the relative bandgap in certain embodiments. The relative bandgap may be increased by increasing $V_B$ and reducing $V_A$. Since upper boundary B is limited by web modes a reduction of web dimension $d_2$ should increase $V_B$. In the limit of $d_2 \rightarrow 0$, web modes vanish and $V_B$ is limited by the second mode guided in the node. On the other hand, $V_A$ is limited by the coupling among adjacent modes which broadens the first band. A reduction of this coupling would narrow the bands and lowers $V_A$. This can be achieved by increasing the distance between nodes, i.e. a lower $d_1/\Lambda$.

FIG. 11B illustrates an expanded view of the mode profiles 1111-1117 shown in the inset of FIG. 11A. The orientation of the fields in the mode profiles is indicated by the direction of the arrows.

Since photonic bandgaps can be identified and/or determined by the modes of lattice of nodes in the cladding, it maybe helpful to understand the nature of these modes. To visualize the origin of modes in a photonic bandgap fiber, consider a single node of high index in a uniform background glass, which corresponds to a conventional optical fiber. This waveguide can support a number of modes dependent on a normalized frequency defined by $V=(2\pi/\lambda)\rho NA$, where $\rho$ is node radius; $NA=(n_n^2-n_B^2)^{1/2}$ is numerical aperture; $n_n$, is node index; $n_B$ is background index; and $\lambda$ is operating optical wavelength. In one example for understanding the nodes in the lattice of a PBGF, consider only the fundamental mode of a single node and add more nodes, one at a time. For example, consider the example calculations illustrated in FIG. 11C for an embodiment of a square lattice.

Figure 11C:
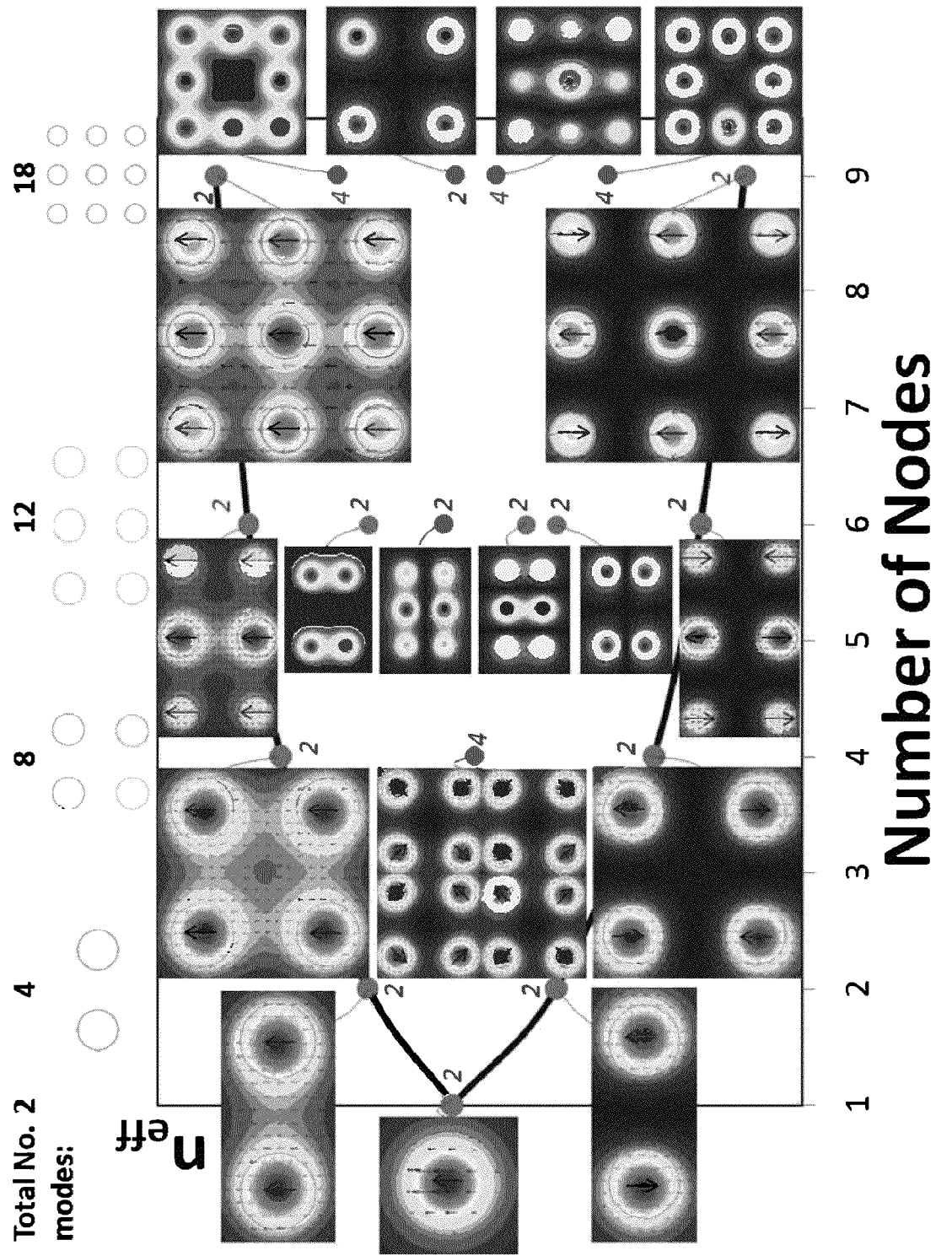
FIG. 11C illustrates modes of coupled nodes for an embodiment of a SQL PBGF.

In FIG. 11C, the vertical axis represents effective mode index and the horizontal axis the number of nodes for an embodiment of a SQL PBGF. The arrangements of the nodes are shown at the top of FIG. 11C for each case. The intensity distributions of each mode and its degeneracy (or near degeneracy) are illustrated next to the data point representing the effective mode index. Resultant field orientations for some modes are also illustrated. The total number of modes for each case, i.e. summation of all modes including degenerate modes, is shown at the top of the FIG. 11C. It is observed in the examples shown in FIG. 11C that the fundamental modes of each node transform into global modes of the lattice when additional nodes are added. Without subscribing to or requiring any particular theory, in general, the total number of modes derived from the fundamental modes in the finite lattice is equal to two times the number of nodes, i.e., the same as the total number of fundamental modes when all the nodes are in isolation. In an embodiment of a PBGF wherein the lattice has infinite nodes, there can be an infinite number modes derived from the fundamental modes of each node in isolation. The upper and lower boundaries of the band formed by the modes are illustrated by the solid lines in FIG. 11C. In this example, the band widens quickly at smaller number of nodes, with a reduced rate of change observed as the number of nodes increases.

With reference to the examples shown in FIG. 11C, the mode defining the upper boundary of the band is the mode with constant phase across the unit cell boundary. This mode has a minimum intensity at the cell boundary and the field at each node is most strongly coupled to that of the adjacent node, analogous to the bonded states of electrons. Furthermore, analogous to electrons where the strong bonded state lowers the total energy and is more stable, this in-phase optical mode has the highest effective mode index among all modes derived from the fundamental modes, and is most strongly guided in this example.

Conversely, in this example the mode defining the lower boundary of the band is the mode with $\pi$ phase jump across the cell boundary. This mode has zero intensity at the cell boundary and the field at each node is most weakly coupled to that of the adjacent nodes, analogous to anti-bonded state of electrons. Furthermore, analogous to electrons where the anti-bonded state raises total energy and is unstable, the anti-phase optical mode has the lowest effective mode index among the band of modes and is least guided in this example. These general characteristics of band formation of modes in an embodiment of a lattice can also be applied to higher order modes in this embodiment, where they may form separate bands.

In some photonic bandgap fibers with low refractive index contrast, such as all-solid photonic bandgap fibers, where scalar approximation is sufficient, the modes defining the upper and lower boundaries of each band are also linearly polarized while the other modes in the band are not necessarily so. An example of this is illustrated in FIG. 11C for the modes of the four-node arrangement in an example of a square lattice. For the other arrangements shown in FIG. 11C, the resultant field orientations of modes defining upper and lower band boundaries are also illustrated to show the linearly polarized fields in the cases with low refractive index contrast. These linearly polarized conditions may not apply to air-core photonic bandgap fibers of high refractive index contrast where vector mode solvers can be used. Without subscribing to or requiring any specific theory, in general, field orientations can strongly deviate from being linear especially at the glass and air interface around each node in this example.

Figure 11D:
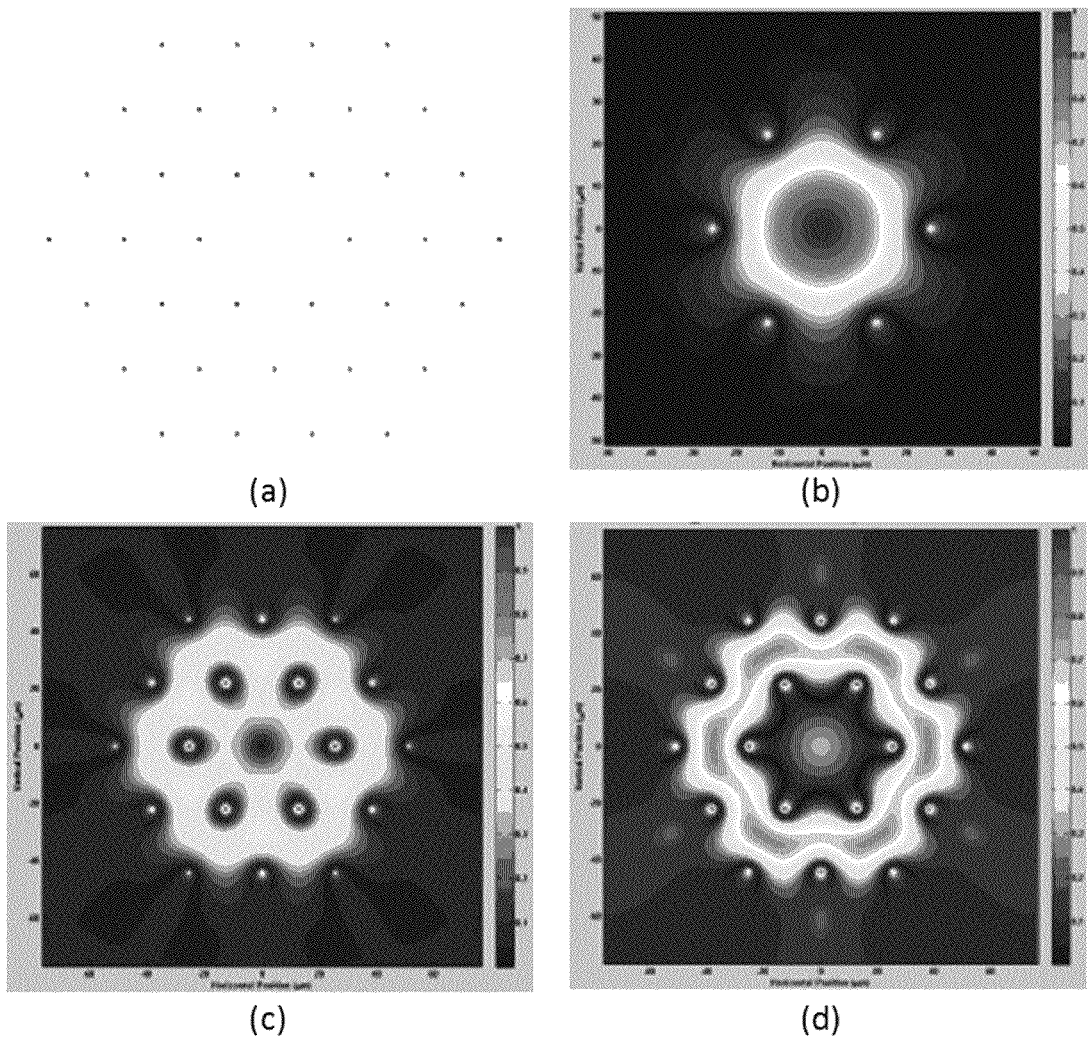
FIG. 11D illustrates defect modes for an all-solid photonic band gap fiber embodiment with hexagonal lattice.

FIG. 11D(a) illustrates an embodiment of an all-solid photonic bandgap fiber with hexagonal cladding lattice. The first three modes for such a fiber are illustrated in FIGS. 11D(b)-11D(d) respectively. Without subscribing to or requiring any particular theory, Applicants believe that FIGS. 11D(a)-11D(d) illustrate that the defect modes in the core of a photonic bandgap fiber are guided by anti-resonant conditions of the nodes in the cladding lattice. It can be also observed from FIGS. 11D(b)-11D(d) that the electromagnetic field intensity around the nodes is approximately zero for the defect modes which demonstrate that the nodes repel the optical field as a result of the anti-resonance which results in the confinement of the defect modes. The horizontal and the vertical axes in FIG. 11D(b) extend from −60 µm to 60 µm with tick marks at every 10 µm. The horizontal and vertical axes in FIGS. 11D(c) and 11D(d) extend from −60 µm to 60 µm with tick marks at every 20 µm.

The dependence of relative bandgap size on relative strut ratio $d_2/d_1$ is also studied for a wide range of relative node size $d_1/\Lambda$ between 0.05 and 0.4 for an embodiment of PBGF. FIG. 12 illustrates that relative bandgap can be increased at smaller values of the relative strut ratio $d_2/d_1$ for any relative node size $d_1/\Lambda$ between 0.05 and 0.4. It can be seen from FIG. 12 that the dependence of the relative bandgap on the relative node size $d_1/\Lambda$ is only significant at small values of the relative strut ratio $d_2/d_1$. It is also observed from FIG. 12, that octave spanning bandgap, e.g., relative bandgap of 0.67, can be achieved in certain examples of PBGFs having sufficiently small $d_2/d_1$ and $d_1/\Lambda$. Thus, it can be inferred that to obtain wide bandgaps in some embodiments of air-core photonic bandgap fibers, the relative strut ratio $d_2/d_1$ and the relative node size $d_1/\Lambda$ can be reduced. In some fabrication methods, relative node size $d_1/\Lambda$ can be adjusted by pressurizing the cladding holes during fiber drawing.

Figure 13:
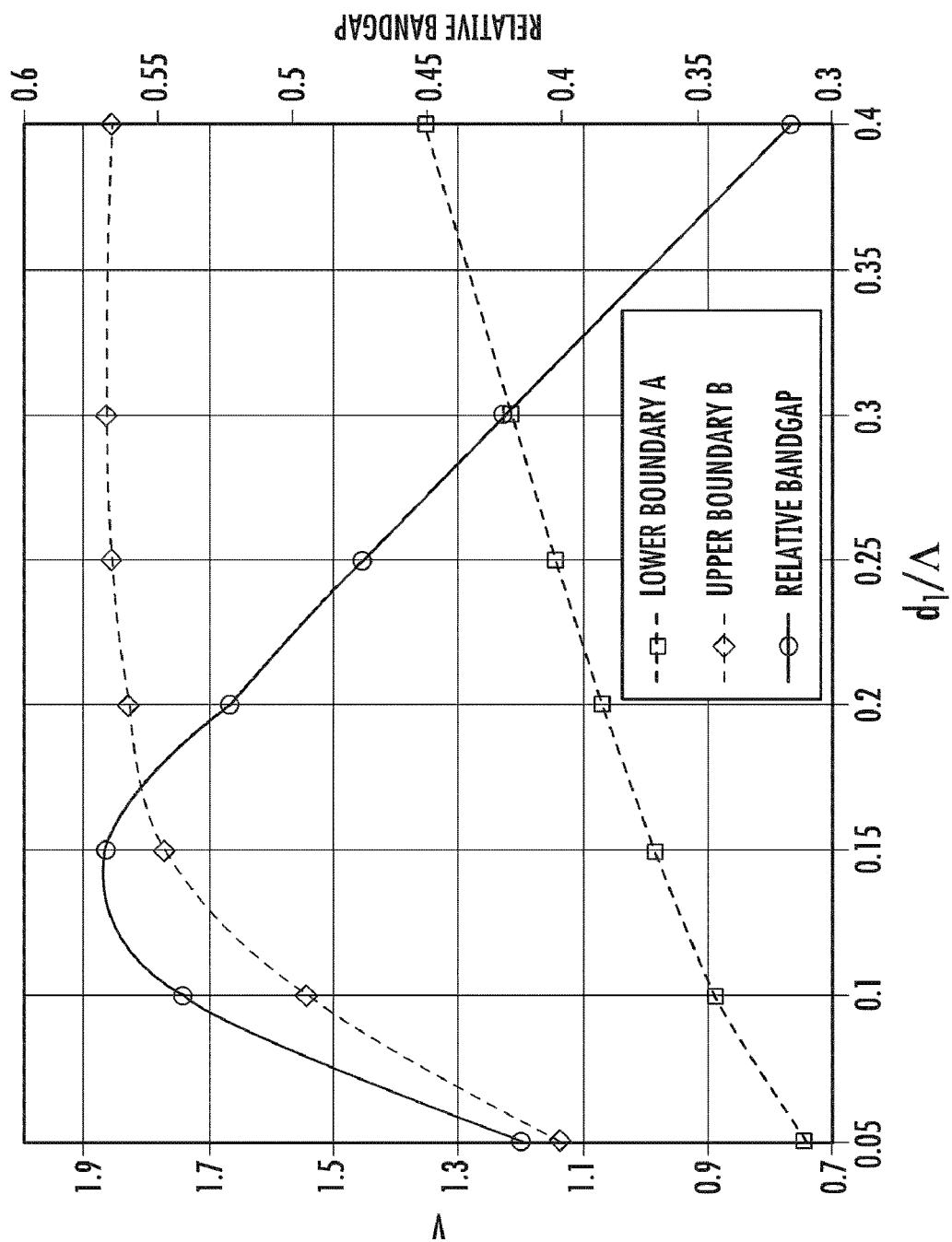
FIG. 13 is a plot illustrating an example of the effect of relative node size ($d_1/\Lambda$) on $V_A$, $V_B$ and relative bandgap.

FIG. 13 illustrates the results of a simulation showing dependence of $V_A$, $V_B$ and relative bandgap on relative node size $d_1/\Lambda$ for $d_2/\Lambda=0.05$ for an embodiment of a PBGF. As the lower boundary $V_A$ is limited by the coupling between the node modes of the first band 1104, it is expected to decrease with a decrease of the relative node size $d_1/\Lambda$, the decrease corresponding to an increase of separation $\Lambda$. This is indeed the case as shown in the FIG. 13. A reduction in the relative node size $d_1/\Lambda$, implies a longer web which has a weak effect on $V_B$ when $d_1/\Lambda>0.15$ as shown in FIG. 13. At larger $d_1/\Lambda$, the reduction in $V_A$ dominates and this leads to an increase of relative bandgap with a reduction of $d_1/\Lambda$. At small $d_1/\Lambda$, the reduction in $V_B$ starts to dominate and leads to a reduction of relative bandgap with a reduction of $d_1/\Lambda$. The reduction $V_B$ at small $d_1/\Lambda$ could be possibly due to an increase in the confinement of strut modes as a sequence of the significantly increased strut length in this PBGF embodiment. For $d_2/d_1=0.05$, the combined effects lead to a maximum relative bandgap at $d_1/\Lambda$ approximately equal to 0.15.

Figure 14:
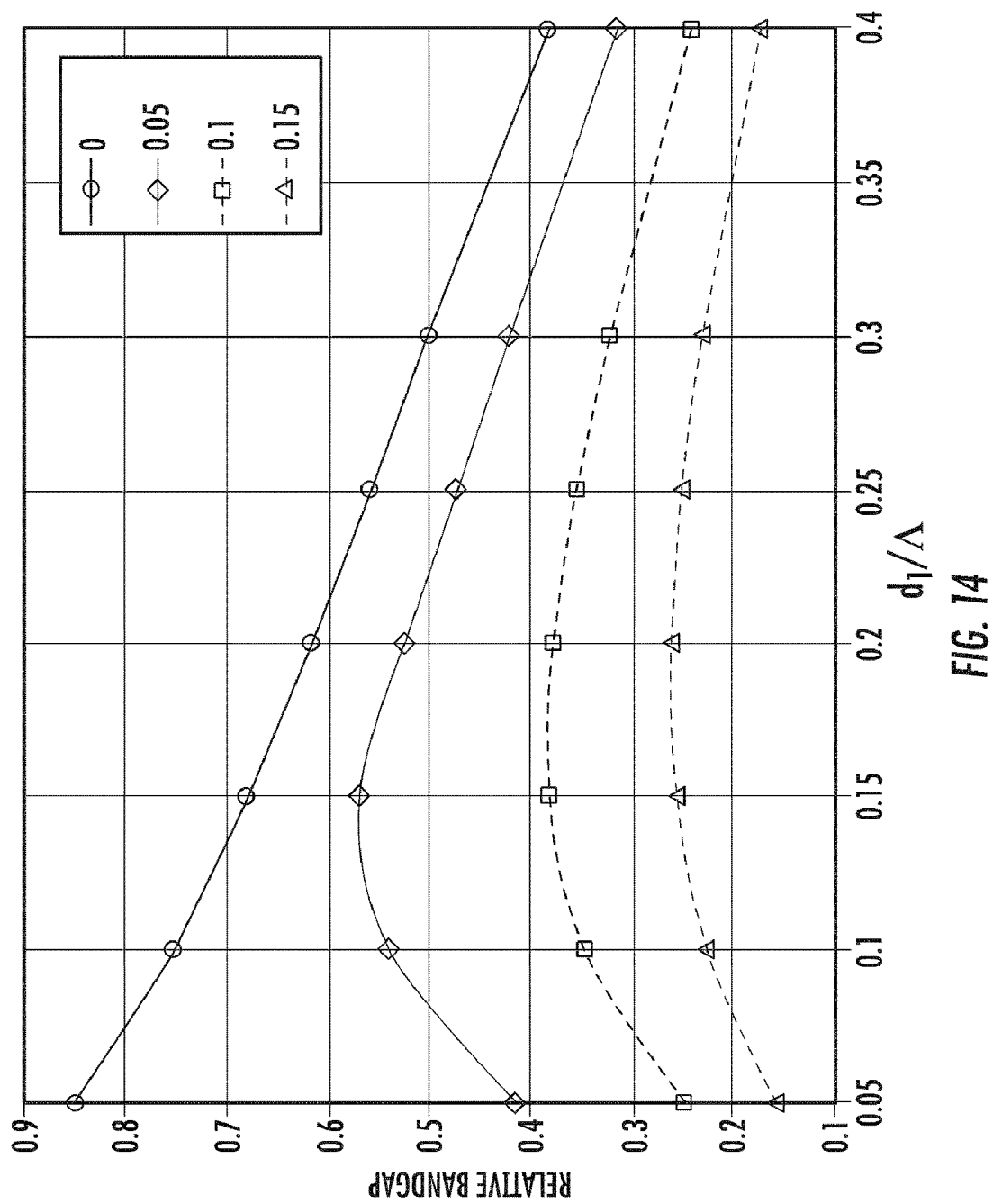
FIG. 14 is a plot showing an example of the dependence of relative bandgap on the relative node size ($d_1/\Lambda$).

FIG. 14 illustrates the dependence of relative bandgap on $d_1/\Lambda$ for various values of $d_2/\Lambda$ from 0 to 0.15. The relative bandgap generally has a maximum and this maximum moves towards smaller $d_1/\Lambda$ with a reduction of $d_2/\Lambda$. When there is no web or strut, i.e. ($d_2/\Lambda=0$), the largest relative bandgap, which continues to increase as $d_1/\Lambda$ decreases. It is also observed that in this example calculation, the relative bandgap in general reduces quickly with an increase of relative strut width $d_2/\Lambda$ having the largest value for a fiber without any struts.

Figure 15:
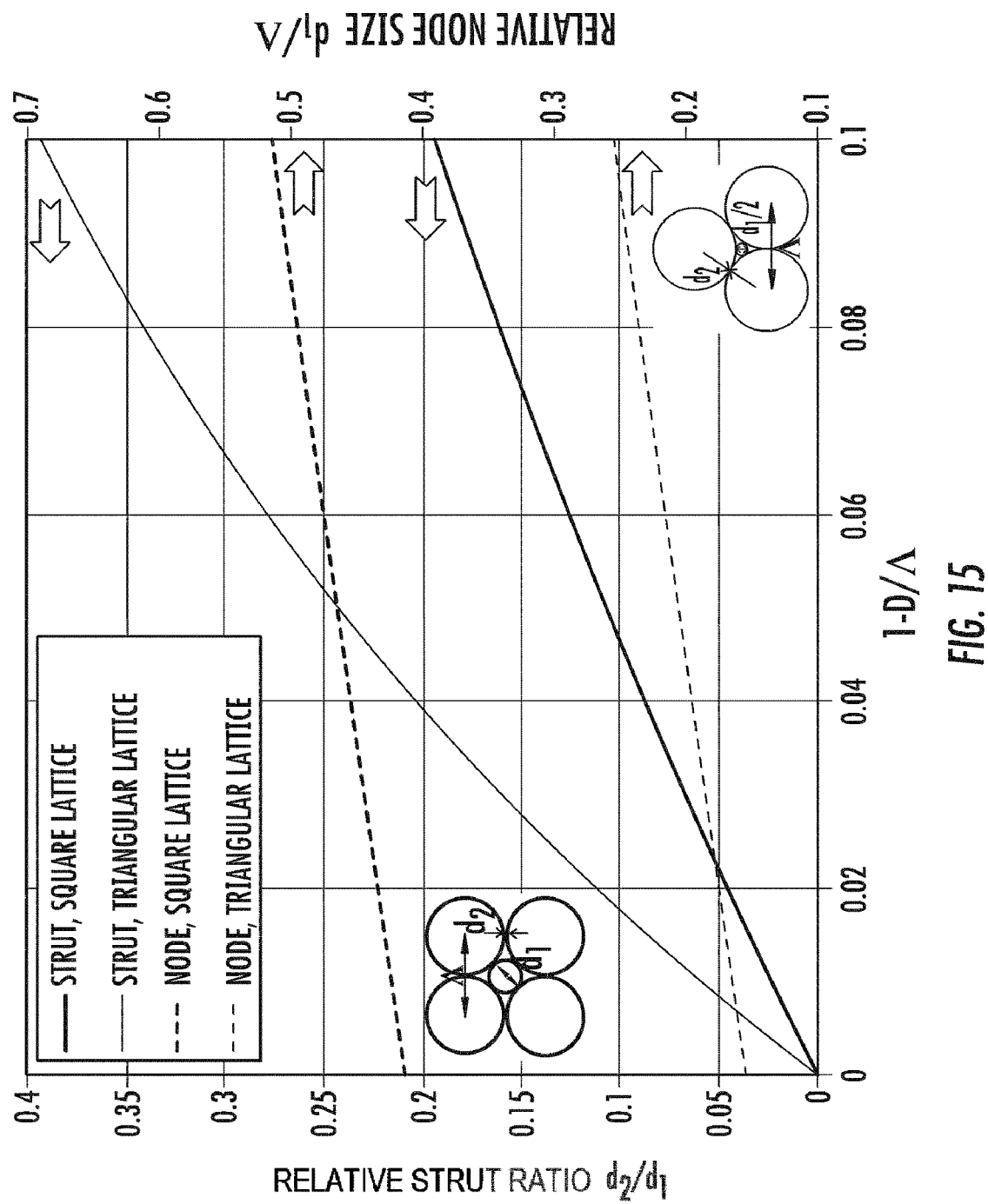
FIG. 15 illustrates an example of the dependence of the relative node size $d_1/\Lambda$ (right vertical axis) and the relative strut ratio $d_2/d_1$ (left vertical axis) on $D/\Lambda$, (where D is inner diameter of the tubes used in the stack) for an embodiment of a triangular lattice PBGF and an embodiment of a square lattice (PBGF).

In some fabrication methods, circular capillaries with outer diameter $\Lambda$ and inner diameter D are stacked with interstitial holes filled with rods to make the cladding lattice. A comparison of examples of fibers having triangular lattice and examples of fibers having a square lattice are shown in FIG. 15. The geometry of the cross-section of an example of a fiber having a triangular lattice and an example of a fiber having a square lattice are shown in the insets of FIG. 15. FIG. 15 illustrates the relative node size $d_1/\Lambda$ (right vertical axis) and the relative strut ratio $d_2/d_1$ (left vertical axis) for triangular and square lattice plotted versus $1-D/\Lambda$ (horizontal axis), where D is inner diameter of the tubes used in the stack.

With reference to the examples shown in FIG. 15, the relative strut ratio and relative node size may be limited by the geometrical constraints of the lattice. The dependence of $d_2/d_1$ and $d_1/\Lambda$ are calculated for these examples for various relative capillary wall thickness $1-D/\Lambda$ in FIG. 15. It can be seen from FIG. 15 that a much smaller $d_2/d_1$ is possible with a square lattice in this example. For example, it is observed from FIG. 15 that values of $d_2/d_1$ as low as 0.1 are possible in some fibers with a square lattice. Larger node and thinner webs or struts can be simultaneously achieved with a square lattice. This structure allows embodiments of a square lattice to achieve much wider bandgaps than possible with embodiments of a triangular or hexagonal lattice. In some fabrication methods, the relative wall thickness can be greater than about 0.05 so as to avoid the difficulty associated with the handling of capillaries with thin walls. Pressurization of cladding holes can be used to further expand the holes during fiber draw process. This can have an additional effect of reducing web or strut width as compared to the node size in some fabrication methods, leading to further reduction of $d_2/d_1$ which can lead to further reduction of web size and can also be used to reduce node size for increasing or maximizing the relative bandgap. In some fabrication methods, $d_2/d_1 < 0.05$ may be possible with a square lattice.

The model was calculated with an assumption of an infinite lattice without defects, and without a central core. Introducing a core may be equivalent to a perturbation which in turn affects the cladding modes. Guided modes in the core may be of interest. As discussed above, guided core modes can have an effective index close to the airline 1103. To the extent that the presence of the defect in the cladding may result in additional cladding modes, such modes will be trapped in the cladding. Thus, the approximation provided with the simulation (or computational approach described above) could be sufficient for design and application of embodiments of the wide-bandwidth low loss, SQL PBGF.

Various Embodiments, Features, and Example Applications

Many variations and implementations of large bandwidth PBGFs are possible. A wide variety of alternative configurations are also possible. For example, components (e.g., layers) may be added, removed, or rearranged. Similarly, processing and method steps may be added, removed, or reordered. PGBF's may have a hollow core (HC). PBGF's may be polarization maintaining (PM). PBGFs may have, for example, a lattice structure that can be periodic or non-periodic. The lattice structure may be rectangular or may be square. Hole sizes may be nearly uniform or may vary, for example with increasing hole size with radial distance. Hole shapes may vary, and may comprise a hole boundary having linear and curved portions. Holes may be regularly spaced, or irregularly spaced, for example randomly distributed. In various embodiments, the cladding glass may comprise silica. In various embodiments, a fiber diameter may be in a range from about 125 μm to about 400 μm and the core diameter may be in a range from about 10 μm to about 100 μm. In various embodiments, an air-filling fraction may be at least about 80% and up to about 95%. In various embodiments, a minimum transmission loss may be in a range from about 70 dB/km to about 0.1 dB/km. In various embodiments, a SQL PBGF may have a minimum loss in a range from about 70 dB/km to about 0.1 dB/km, with 2-10 layers of air holes, or with 2-5 layers of air holes. In various embodiments a web width may be less than about 200 nm, or in a range from about 50 nm to about 200 nm. An aspect ratio, corresponding to a length to width ratio $d_3/d_2$, of the webs may be in a range from about 5:1 up to about 40:1.

One example of a HC PBGF may have $d_1/\Lambda = 0.15$ and $d_2/d_1 = 0.05$, resulting in a relative bandgap of about 56%. This fiber can be achieved by first square-stacking a preform and then pressurizing the cladding during drawing to further expand the air portion of the preform as set forth above.

In a second example, a HC PBGF may have $d_1/\Lambda = 0.1$ and $d_2/d_1 = 0.02$, resulting in a fiber with a relative bandgap of ~65%.

In various embodiments of a HC SQL PGBF a relative bandgap may exceed about 50%, and may be in the range from about 35%-80% or about 50% to 80%.

In various embodiments $d_2/d_1$ may be in a range from about 0.01 to about 0.1, and $d_1/\Lambda$ in a range from about 0.05 to about 0.3.

In various embodiments with $d_2/d_1$ may be less than about 0.1, and the PBGF may be configured such that a relative wavelength transmission window $\Delta\lambda/\lambda_c$ is larger than about 0.35

In various embodiments $d_2/d_1$ maybe in a range from about 0.01 to about 0.1, and $d_1/\Lambda$ in a range from about 0.05 to about 0.3. In various embodiments $\Delta\lambda/\lambda_c$ may be in the range from about 0.35 to about 0.85. In various embodiments the rectangular lattice may comprise 2 to 5 layers of cladding material.

Figure 16:
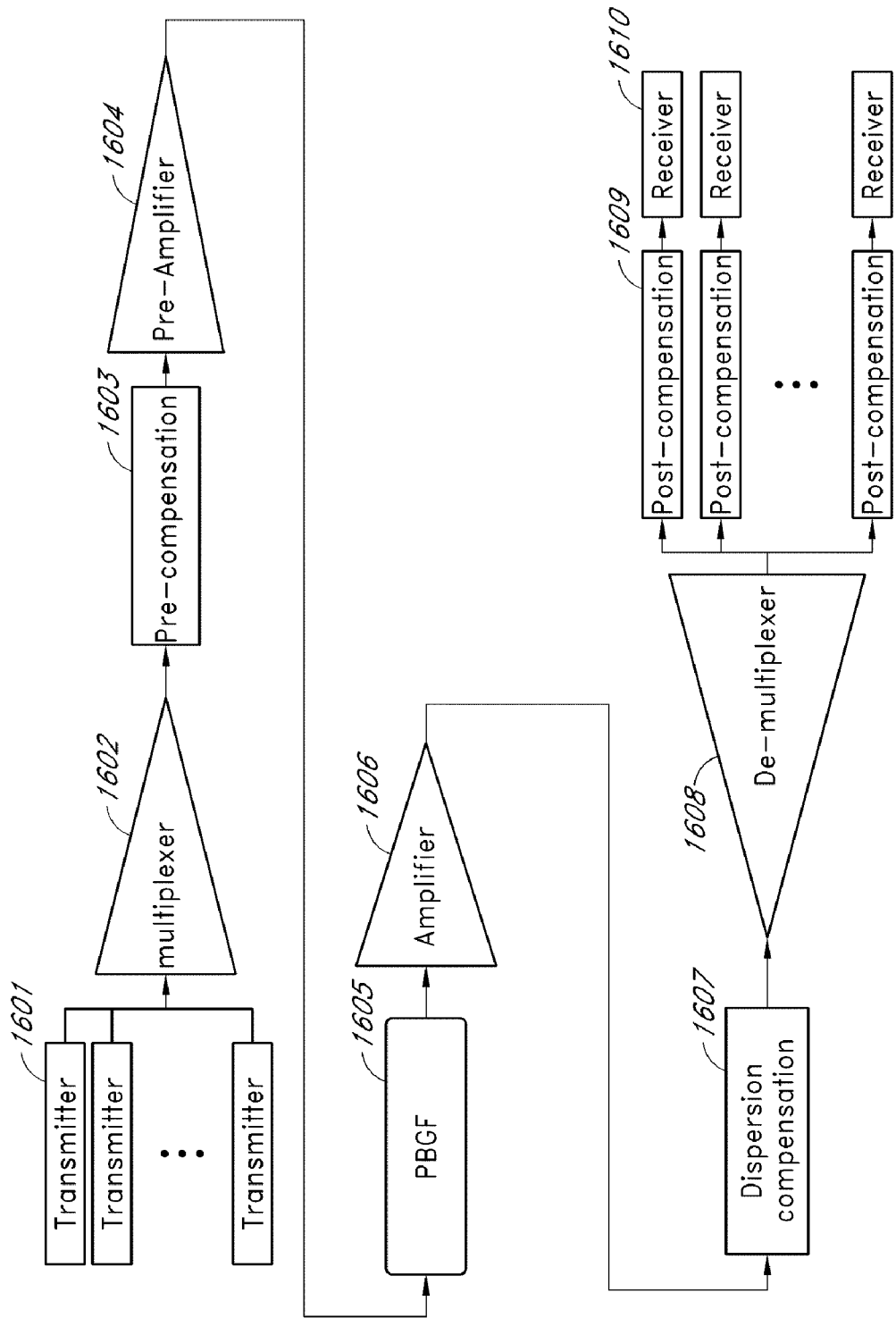
FIG. 16 is a block diagram schematically illustrating an example of a single span telecommunication system incorporating a PBGF.

The photonic bandgap fibers described herein can be incorporated in numerous applications. For example, FIG. 16 is a block diagram schematically illustrating a single span telecommunication system incorporating a PBGF 1605 (e.g. a HC SQL PBGF, or other fibers described herein). Signals from transmitters 1601 are multiplexed by a multiplexer 1602 and are then pre-compensated by a dispersion pre-compensation unit 1603 and amplified by an amplifier 1604. A single span of PBGF 1605 is used for transmitting the signals over a distance from source to destination. The transmitted signals are then amplified at the destination by an amplifier 1106. A dispersion compensation unit 1607 is used before the de-multiplexer 1608. Each signal is finely compensated by post-compensation unit 1609 to take out any channel dependent transmission distortion before receipt by a plurality of receivers 1610.

Figure 17:
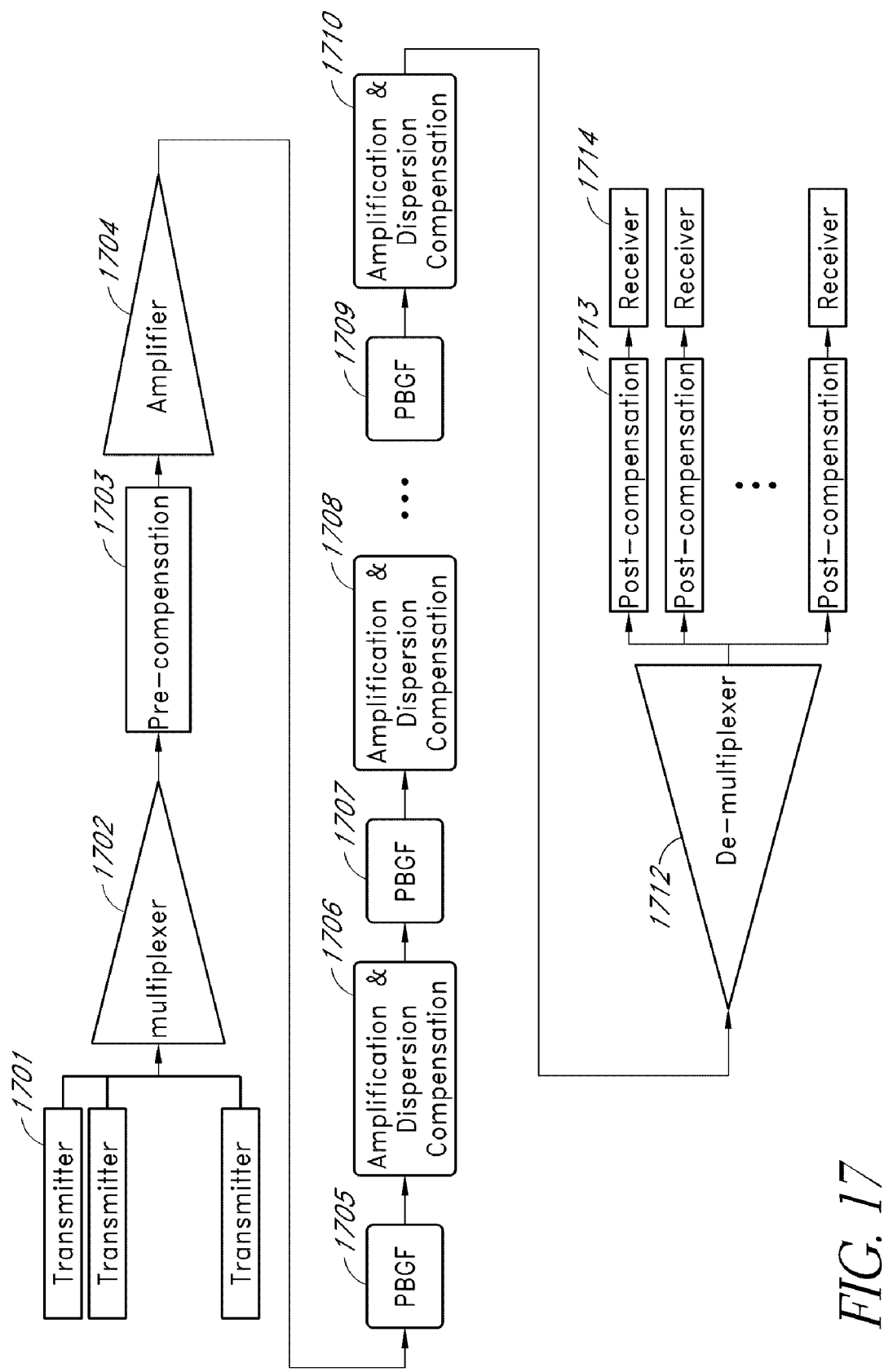
FIG. 17 is a block diagram schematically illustrating an example of a multiple span telecommunication system incorporating PBGFs.

FIG. 17 illustrates a similar transmission system that also includes transmitters 1701, a multiplexer 1702, a pre-compensation unit 1703 and an amplifier 1704 on the source end and a demultiplexer 1712, a plurality of post-compensation units 1713 and receivers 1714 on the destination end. In the system shown in FIG. 17, however, multiple spans of PBGF 1705, 1707, 1709 are included. In various embodiments, the PBGFs 1705, 1707 and 1709 can comprise HC SQL PBGFs or other fibers described herein. Additional dispersion compensation units and amplifiers 1706, 1708, and 1710 in each span are also included. Optical connection is provided between the optical components as shown in FIGS. 16 and 17, although structures may be included between these optical components as well. A variety of these components may comprise optical fibers. FIGS. 16 and 17 only show the key components of a telecommunication system. Additional components can be added. Likewise, some components in FIGS. 16 and 17 can be omitted and/or locations changed in different embodiments. Other configurations and variations are also possible.

PBGFs can also be employed in systems for generating optical pulses such as ultrafast optical pulses. Additional details regarding ultrafast pulse systems is included in U.S. Pat. No. 7,190,705, entitled "Pulsed Laser Sources" and U.S. patent application Ser. No. 10/814,319 entitled "High Power Short Pulse Fiber Laser", published as U.S. Patent Publication No. 2005/0226278, each of which is hereby incorporated by reference herein in its entirety.

Figure 18A:
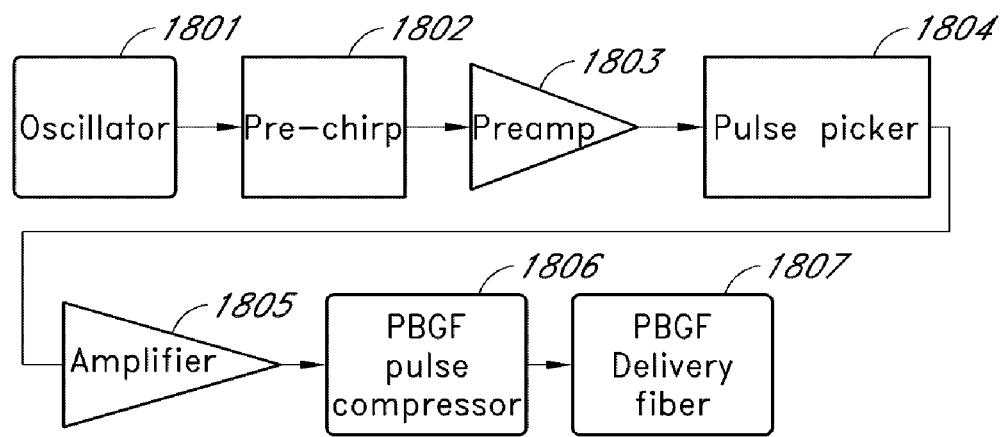
FIGS. 18A and 18B are block diagrams schematically illustrating examples of fiber chirped pulse amplification systems incorporating PBGFs.
Figure 18B:
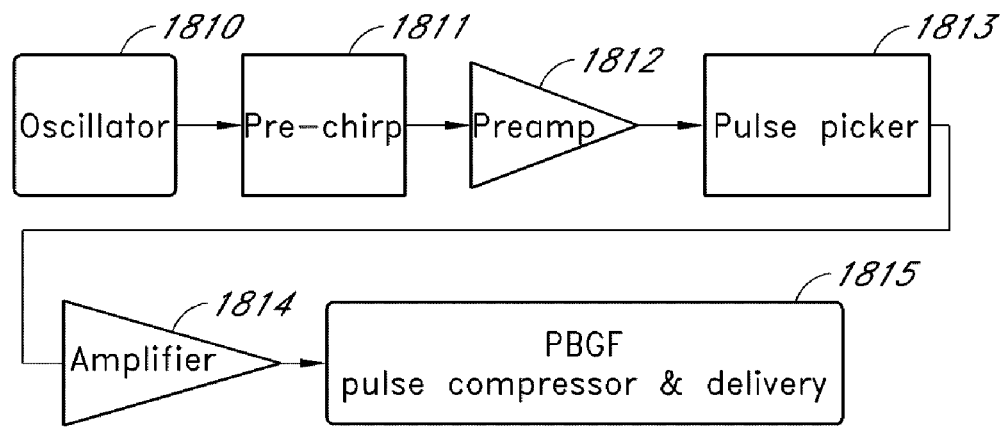

FIG. 18A, for example, illustrates a fiber chirped pulse amplification (FCPA) system incorporating a dispersion tailored PBGF 1806 (e.g. a HC SQL PBGF, or other fibers described herein). Pulses from oscillator 1801 are pre-chirped by using a pre-chirp unit 1802 and are then amplified by a pre-amplifier 1803. Pulse picker 1804 can be used to pick a subset of pulses, which are then amplified by main amplifier 1805. The PBGF 1806 is used to compress the amplified pulses, which are subsequently delivered by a low dispersion PBGF delivery fiber 1807. Optical connection is provided between the optical components as shown in FIG. 18A although structures may be included between these optical components as well. A variety of these components may comprise optical fiber or optical fiber devices. FIG. 18B, also shows a fiber pulse amplification system comprising an oscillator 1810, a pre-chirp unit 1811, a preamplifier 1812, a pulse picker 1813, and a main amplifier 1814. In FIG. 18B, however, the PBGF compressor and delivery fiber are combined into a single fiber 1815. In various embodiments, the combined fiber 1815 can comprise a HC SQL PBGF, or other fibers described herein. FIGS. 18A and 18B only show the key components of a pulse amplification system. Additional components can be added. Likewise, some components in FIGS. 18A and 18B can be omitted and/or locations changed in different embodiments. Other configurations and variations are also possible.

Figure 19A:
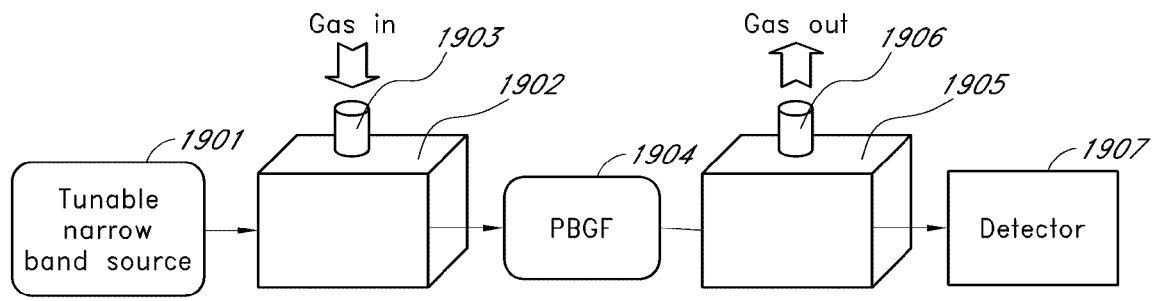
FIG. 19A is a block diagram schematically illustrating an example of a gas detection system based on spectral transmission measurement using a PBGF.

A PBGF (e.g. a HC SQL PBGF or other fibers described herein) with low loss and a wide transmission band can also be used for trace gas analysis with much improved sensitivity due to the long interaction length. FIG. 19A illustrates such a system that detects, identifies, quantifies, or otherwise performs measurements on gases based on spectral absorption. A tunable source 1901 is optically coupled to a PBGF 1904 through a multiplexer 1902, which allows gas to be injected into the core of the PBGF 1904. A gas filter 1903 may be employed to take out solid particles in the gas stream. At the output end, a de-multiplexer 1905 is used to separate gas and the optical beam. The optical beam is then directed to a detector 1907. Gas pumps can be connected to gas filter 1903 and/or gas outlet 1906 to speed up gas flow.

Figure 19B:
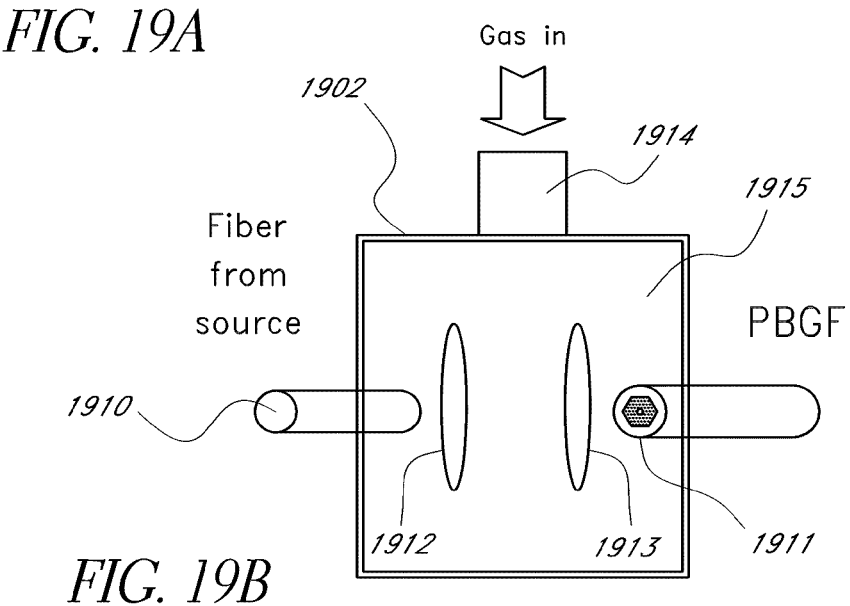
FIGS. 19B and 19C are schematic drawings of examples of a multiplexer and a demultiplexer, respectively, for combining and separating the gas and the light in the gas detection system of FIG. 19A.
Figure 19C:
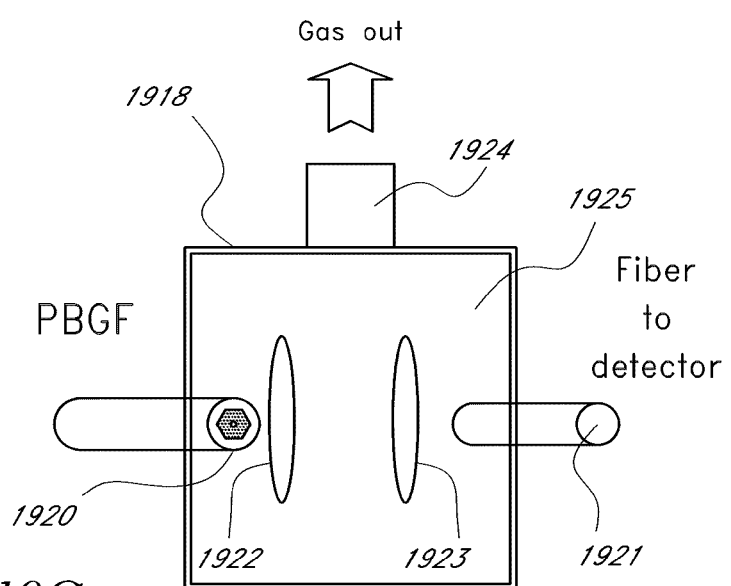

FIG. 19B illustrates a configuration of the multiplexer 1902 comprising a sealed chamber 1915. Source light propagated by a fiber 1910 is collimated by a collimating lens 1912 and focused by lens 1913 into an input end 1911 of the PBGF 1904. Gas is input through a gas input 1914 which may comprise a filter as described above. The de-multiplexer 1905 is illustrated in FIG. 19C. The de-multiplexer also comprises a chamber 1918, an output end 1920 of the PBG fiber 1904 as well as a collimating lens 1922 and a focusing lens 1923 which receives the light output from the output 1920 of the PBGF 1904 and couples the light into an output fiber 1921. The demultiplexer 1905 further comprises a gas output port 1924. In various embodiments, a broad band source and a monochromator can be used instead of the tunable light source 1901 in FIG. 19A.

In such a system gas is introduced into the multiplexer and enters into portions of the PBGF though holes or openings therein. In various embodiments, the core is hollow and the gas enters the hollow core. The gas affects the propagation of the light, for example, by attenuating the light due to absorption at one or more wavelengths. The absorption spectrum of the gas can, therefore, be measured using the detector 2008 and monochromator or tunable filter 2007. In certain embodiments such as shown in FIGS. 19A-19C the gas is flowed through the PBGF 1904. In such cases, the long length of the fiber 1904 may increase the interaction of the gas with the light and provide a higher signal. In other embodiments, other properties of the light may be measured.

Figure 20A:
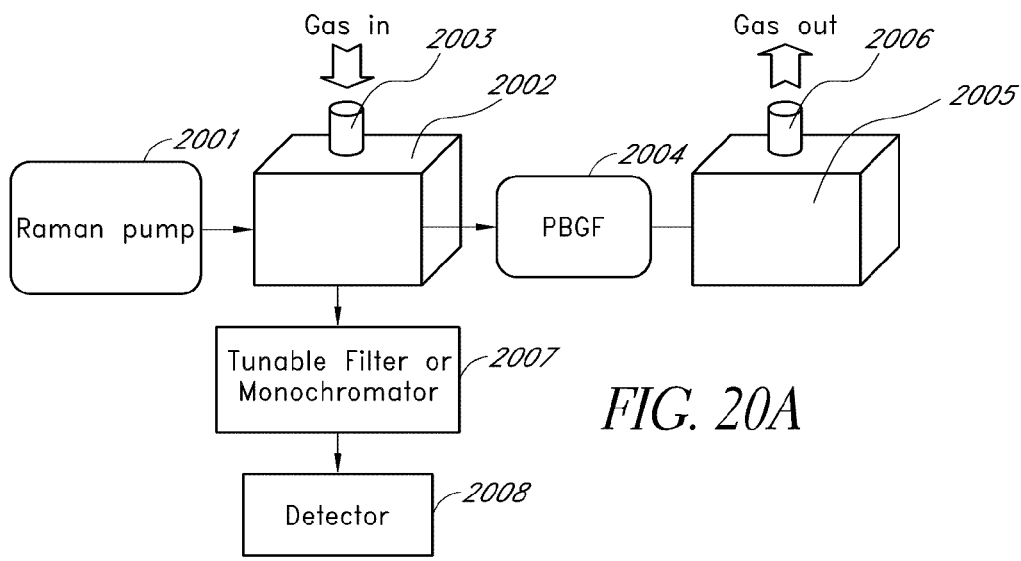
FIG. 20A is a schematic illustration of an example of a gas detection system based on backward Raman scattering in a PBGF.

FIG. 20A, for example, illustrates a trace gas detection system based on detection of Raman scattered light. The gas is introduced into the fiber and causes Raman scattering which is measured. The gas may enter openings in the fiber and may, in certain embodiments, flow through the hollow core of the PBGF. As described above, the long interaction length of the PBGF provides increased detection sensitivity. An additional advantage is that a large part of the Raman-scattered light is collected and can also propagate within the photonic bandgap fiber. This feature is especially true for PBGF with a wide transmission band, i.e. larger solid collection angle.

In the embodiment shown in FIG. 20A, a Raman pump 2001 is optically coupled through a multiplexer 2002 to a PBGF 2004. An output end of the PBGF 2004 is optically coupled to a de-multiplexer unit 2005. Gas enters through a filter 2003 that removes solid particles. Gas exits through the outlet 2006 on the de-multiplexer. Pumps can be used at the inlet 2003 and the outlet 2006 to speed up gas flow. Back-propagating scattered light by Raman scattering is directed towards a tunable filter or a monochromator 2007 and onto the detector 2008. The tunable filter or monochromator 2007 and detector 2008 can measure the wavelength spectrum of the scattered light.

Figure 20B:
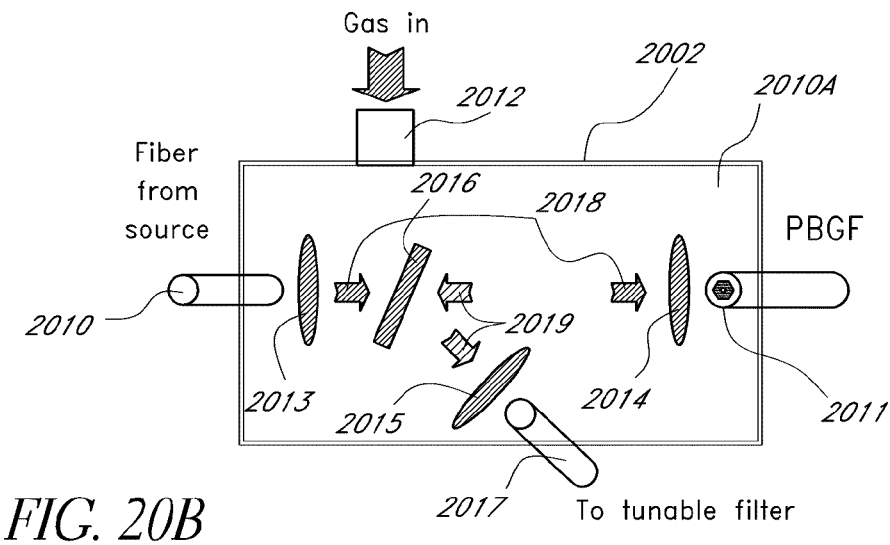
FIGS. 20B and 20C are schematic drawings of examples of a multiplexer and a demultiplexer, respectively, for combining and separating the gas and the light in the gas detection system of FIG. 20A.

The multiplexer 2002 comprising a sealed chamber 2010A is illustrated in FIG. 20B. Pump light is carried in by an optical fiber 2010 optically coupled to the pump source 2001 and is then collimated by a collimating lens 2013. The collimated pump beam 2018 is focused by a focusing lens 2014 into an input end 2011 of the PBGF 2004. A back-propagating scattered Raman signal 2019 is reflected by a filter 2016, which is designed to only reflect Raman signal but not the pump light. The Raman signal 2019 is focused by a focusing lens 2015 onto an output fiber 2017 optically connected to the tunable filter or monochromator. Gas enters in through an gas inlet port 2012 which may comprise a filter.

Figure 20C:
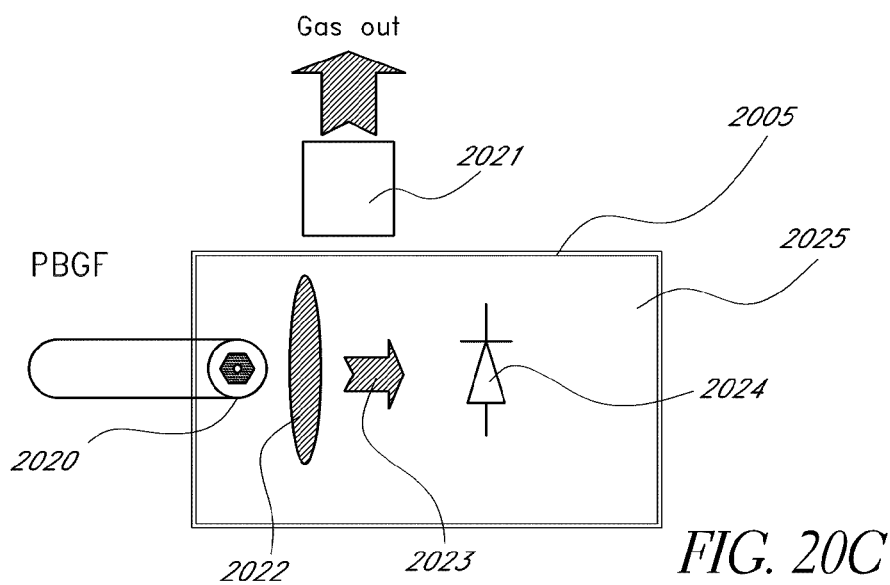

The de-multiplexer 2005 is illustrated in FIG. 20C. The de-multiplexer 2005 comprises a sealed chamber 2025 and a collection lens 2022 that collect pump light from an end 2020 of the PBGF 2004. The de-multiplexer further comprises a detector 2024 for monitoring the pump light that propagates through the PBGF 2004. The collection lens 2022 couple the pump light from the end 2020 of the PBGF 2004 and directs the pump light onto the detector 2024.

Figure 21A:
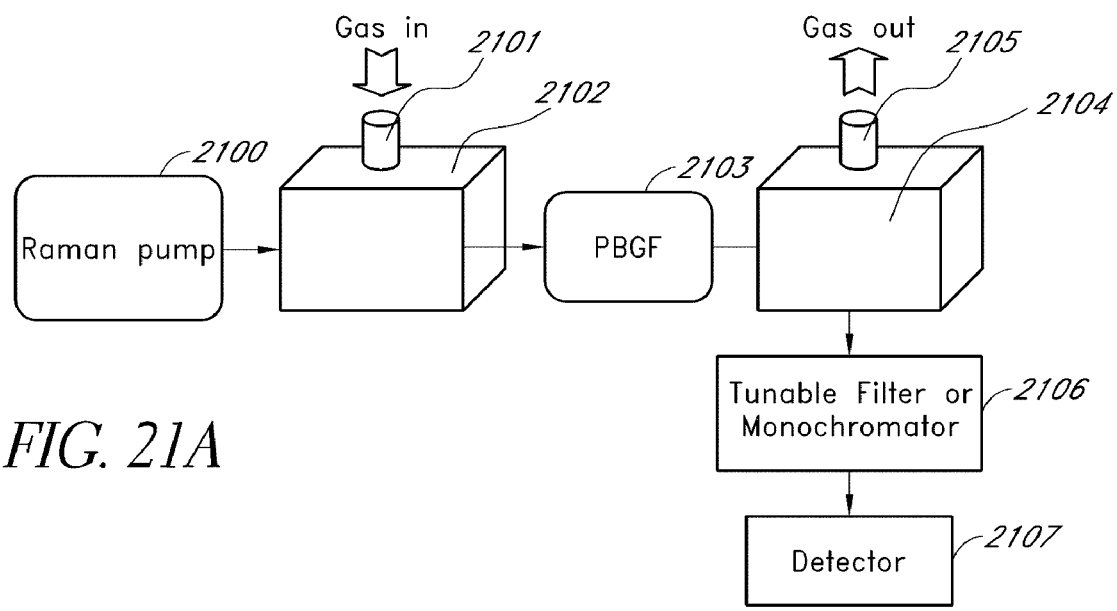
FIG. 21A is a schematic illustration of an example of a gas detection system based on forward Raman scattering in a PBGF.

FIG. 21A shows a Raman detection system based on detection of a forward propagating Raman signal. In certain embodiments, operation is in the stimulated Raman regime, where much stronger signal is expected due to amplification in the presence of high pump power. The configuration shown in FIG. 21A can also be used in a stimulated Raman mode to detect stimulate Raman emission.

The Raman detection system shown in FIG. 21A comprises a Raman pump 2100, a multiplexer 2102 having a gas input port 2101, a PBG fiber 2103, and a demultiplexer 2104 having a gas output port 2105. The system further includes a tunable filter or monochromator 2106 optically coupled to the demultiplexor 2104 so as to receive the Raman signal therefrom. A detector 2107 is also included to sense the Raman signal.

Figure 21B:
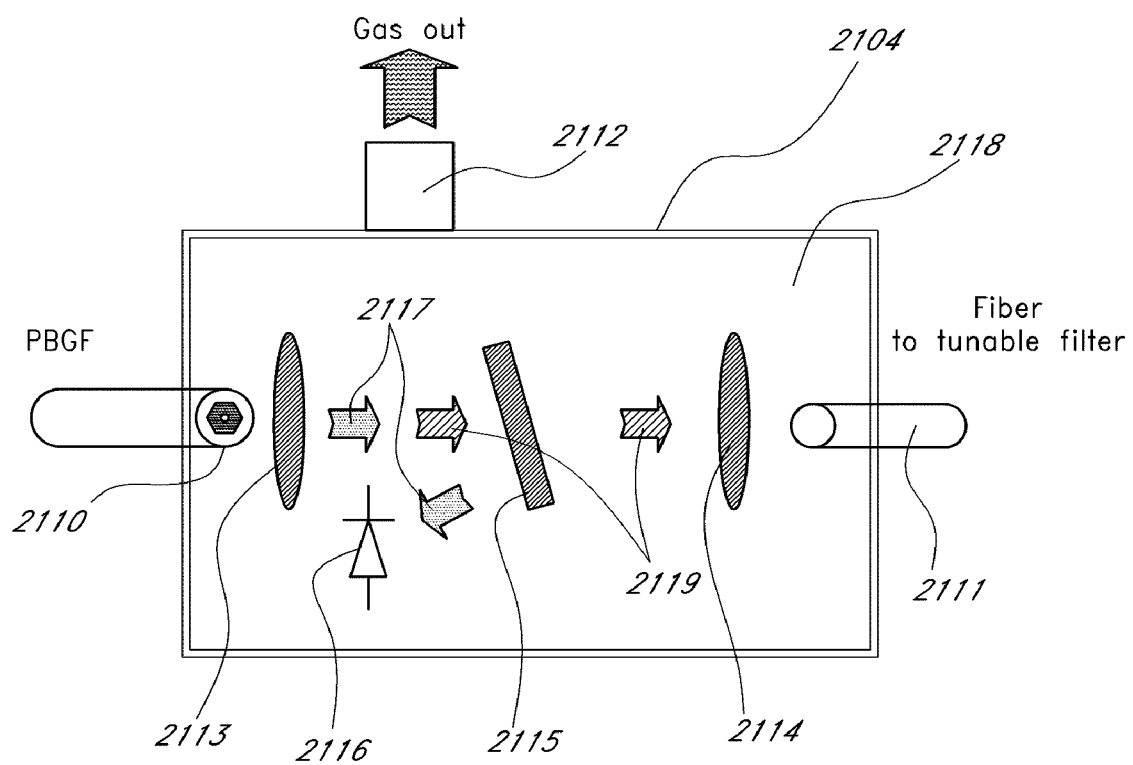
FIG. 21B is a schematic drawing of an example of a demultiplexer for separating the gas and the light in the gas detection system of FIG. 21A.

The de-multiplexer 2104 is illustrated in FIG. 21B. The demultiplexer 2104 comprises a sealed chamber 2118 that contains the gas. Pump and Raman signals are introduced into the chamber 2118 by an output end 2110 of the PBG fiber 2103. The pump and Raman signals are collimated by a collimating lens 2113. The Raman signal 2119 passes through filter 2115, which is designed to reflect the pump light. This Raman signal 2119 is focused by a lens 2114 onto the fiber 2111 that directs the light to the tunable filter or monochromator 2106. The pump light 2117 is reflected by the filter 2115 onto a detector 2116 for power monitoring. The multiplexer 2102 is similar to that shown in FIG. 19B.

Optical connection is provided between the optical components as shown in FIGS. 19A, 20A, and 21A although structures may be included between these optical components as well. A variety of these components may comprise optical fiber or optical fiber devices.

The systems and components shown in FIGS. 19A,-19C, 20A-20C, 21A, and 21B are examples only. One skilled in the art may devise alternative configurations and designs. For example, the filter 2016 shown in FIG. 20B can be designed to reflect the pump light and pass the signal. The fiber positions may be different in such an embodiment. Similarly, the filter 2115 in FIG. 20B can be designed to reflect the Raman signal. Fiber positions may likewise be different. The pump monitoring functions in FIGS. 20C and 21B can be eliminated. Fibers used to carry light to filters and detectors in FIGS. 20B, 20B, 20C, and 21B can also be eliminated by using bulk optics. Alternatively, optical fibers can be used to guide the light. In some embodiments, the PBGF ends can be sealed while gas can enter and exit the core of the PBGF through holes drilled on the side of the fiber. In fact, many holes can be drilled along the fiber to speed gas flow and make gas uniformly distributed along the PBGF. In certain embodiments, however, gas enters and/or exits the PBGF through one or both endfaces.

Other variations are also possible. Additional components can be added to the systems. Likewise, some components in FIGS. 19, 20, and 21 can be omitted and/or locations changed in different embodiments. Other configurations and variations are also possible. The components can also be designed differently. For example, other configurations and designs the multiplexers and demultiplexers may be used. In certain embodiments, one or both the multiplexer or demultiplexer may be excluded. Additionally, in any of the example applications described herein a single continuous PBGF or separate portions of PBGF may be used. Other applications not discussed herein or in the '619 patent are possible as well. Moreover, polarization-maintaining (PM) fibers as illustrated herein are often beneficial, and may be required for applications where preservation of polarization is important.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Accordingly, although the inventions described herein have been disclosed in the context of certain embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with, or substituted for, one another in order to form varying modes of the disclosed inventions. No element or group of elements is necessary or indispensable to each embodiment. Thus, it is intended that the scope of the present inventions herein disclosed should not be limited by the particular disclosed embodiments described above.

What is claimed is:

1. A photonic bandgap fiber (PBGF) for propagating light having a wavelength, $\lambda$, said fiber comprising:
   a core; and
   a cladding disposed about said core,
      wherein said cladding comprises a plurality of regions, at least one region having a dimension, $\Lambda$, and is configured such that the cladding at least partially surrounds a hole having a hole dimension, D,
      wherein said plurality of regions are arranged as a rectangular lattice,
      wherein said portions of said cladding form webs and nodes of said lattice such that at least a portion of said webs have a dimension, $d_2$, and are configured as higher aspect ratio cladding material portions,
      wherein a portion of the webs are connected to said nodes, at least a portion of said nodes having a dimension, $d_1$, and configured as lower aspect ratio cladding material portions, and
      wherein $D/\Lambda$ is in a range from about 0.9 to about 0.995 and said PBGF is configured such that a relative wavelength transmission window $\Delta\lambda/\lambda c$ is larger than about 0.35.

2. The photonic bandgap fiber of claim 1, wherein the webs have a second dimension $d_3$, such that the ratio of $d_3$ to $d_2$ is at least approximately 5:1.

3. The photonic bandgap fiber of claim 2, wherein the ratio of $d_3$ to $d_2$ is at least approximately 10:1.

4. The photonic bandgap fiber of claim 2, wherein the ratio of $d_3$ to $d_2$ is at least approximately 25:1.

5. The photonic bandgap fiber according to claim 1, $d_2/\Lambda$ is in a range from about 0.01 to about 0.1, and $d_1/\Lambda$ in a range from about 0.1 to about 0.5.

6. The photonic bandgap fiber according to claim 1, wherein $\Delta\lambda/\lambda c$ is in the range from about 0.35 to about 0.65.

7. The photonic bandgap fiber according to claim 1, wherein said rectangular lattice comprises 2 to 5 layers of cladding regions.

8. The photonic bandgap fiber according to claim 1, wherein said fiber is drawn from a preform having webs and nodes having sizes larger than $d_1$ and $d_2$, and said PBGF is configured such that a relative reduction in the node size is substantially less than a relative reduction in the web size.

9. The photonic bandgap fiber according to claim 8, wherein said preform is configured with preform parameters $D/\Lambda$ in a range from 0.5 to 0.95, $d_2/\Lambda$ in a range from 0.05 to 0.5, and $d_1/\Lambda$ in a range from 0.2 to 0.6.

10. The photonic bandgap fiber of claim 1, wherein an air filling fraction of the cladding region exceeds about 80%, and is up to about 95%.

11. The photonic bandgap fiber according to claim 1, wherein a dimension of said core is in a range from about 10 µm to about 100 µm.

12. The photonic bandgap fiber according to claim 1, wherein said fiber is configured as a polarization maintaining (PM) square lattice (SQL) PBGF.

13. The photonic bandgap fiber according to claim 1, wherein said holes contain air.

14. The photonic bandgap fiber according to claim 1, wherein at least a portion of said high index cladding glass comprises silica.

15. A method of fabricating a photonic bandgap fiber of claim 1, comprising:
stacking capillaries and rods to form a rectangular lattice, said rods comprising an optical material;
constructing a preform;
drawing said preform into a fiber; and
controlling core and cladding pressure during said drawing, said core and cladding pressurized with different pressures, said controlling narrowing a web dimension, $d_2$, and substantially limiting changes in node dimension, $d_1$, of said photonic bandgap fiber such that $D/\Lambda$ is in a range from about 0.9 to about 0.99.

16. The method of claim 15, wherein cladding holes are pressurized from about 0.5 to about 2.5 psi and said core is pressurized from about of 0.2 to about 2 psi, and said pressurization of cladding holes exceeds pressurization of said core.

17. The method of claim 15, wherein a web dimension, $d_2$, is less than about 0.25 μm.

18. A method of manufacturing a polarization maintaining photonic bandgap fiber, comprising:
forming a cane comprising a lattice of cladding regions having four-fold symmetry, a core, and a having substantially circular outer diameter, said canes comprising an optical material;
forming a circular preform using said cane;
modifying said circular preform to form a non-circular shape;
drawing said preform into a fiber; and
transforming said four-fold symmetry of said lattice into two-fold symmetry by deforming said core and said cladding during said drawing thereby introducing birefringence into said fiber.

19. The method of claim 18, wherein said non-circular shape comprises flat boundary portions disposed opposite each other, and at a non-zero angle relative to axes defining said lattice.

20. The method of claim 18, wherein said lattice comprises a rectangular lattice.

21. A system for telecommunications, gas measurement, delivery of high peak power pulses, or laser pulse shaping, comprising a PBGF according to claim 1.

22. A SQL photonic bandgap fiber having a cladding region comprising 2-10 layers of air-holes and configured to provide a relative wavelength transmission window $\Delta\lambda/\lambda c$ larger than about 0.35 and minimum transmission loss in a range from about 70 dB/km to about 0.1 dB/km.

23. A photonic bandgap fiber (PBGF) for propagating light having a wavelength, $\lambda$, said fiber comprising:
a core; and
a cladding region disposed about said core,
wherein said cladding region comprises a plurality of features, said features having a periodicity, $\Lambda$, and is configured such that the cladding region at least partially surrounds a hole having a hole dimension, D,
wherein said plurality of features are arranged as a rectangular lattice,
wherein said cladding region comprises webs and nodes of said lattice such that said webs have a width, $d_2$, and are configured as higher aspect ratio cladding material portions,
wherein the webs are connected to said nodes, said nodes having a dimension, $d_1$, and configured as lower aspect ratio cladding material portions, and
wherein $D/\Lambda$ is in a range from about 0.9 to about 0.995 and said PBGF is configured such that a relative wavelength transmission window $\Delta\lambda/\lambda c$ is larger than about 0.35.

24. A photonic bandgap fiber (PBGF) for propagating light having a wavelength, $\lambda$, said fiber comprising:
a core; and
a cladding disposed about said core,
wherein said cladding comprises a plurality of regions, at least one region having a dimension, $\Lambda$, and is configured such that the cladding at least partially surrounds a hole having a hole dimension, D,
wherein said plurality of regions are arranged as a rectangular lattice,
wherein said portions of said cladding form webs and nodes of said lattice such that at least a portion of said webs have a dimension, $d_2$, and are configured as higher aspect ratio cladding material portions,
wherein a portion of the webs are connected to said nodes, at least a portion of said nodes having a dimension, $d_1$, and configured as lower aspect ratio cladding material portions, and wherein the rectangular lattice comprises 2 to 5 layers of cladding material; and
wherein $D/\Lambda$ is in a range from about 0.9 to about 0.995 and said PBGF is configured such that $d_2/d_1$ is less than approximately 0.15, $d_1/\Lambda$ is in a range from about 0.05 to about 0.3, and said PBGF is configured such that $\Delta\lambda/\lambda c$ is in the range from about 0.35 to about 0.85.

25. The photonic bandgap fiber according to claim 24, wherein $\Delta\lambda/\lambda c$ is in the range from about 0.5 to about 0.85.

26. The photonic bandgap fiber according to claim 24, wherein the PBGF has a relative bandgap greater than approximately 0.4.

27. A method of fabricating a PBGF of claim 24, the method comprising:
constructing a perform, said constructing comprising stacking capillaries and rods to form a rectangular lattice, said rods comprising an optical material;
drawing said preform into the PBG fiber; and
controlling core and cladding pressure during said drawing, said core and cladding pressurized with different pressures, said controlling relatively narrowing a web dimension, $d_2$, and substantially limiting relative changes in node dimension, $d_1$, of said PBGF such that $D/\Lambda$ is in a range from about 0.9 to about 0.99.

28. The method according to claim 27, wherein cladding holes are pressurized from about 0.5 to about 2.5 psi and said core is pressurized from about of 0.2 to about 2 psi, and said pressurization of cladding holes exceeds pressurization of said core.

29. The method according to claim 27, wherein a web dimension, $d_2$, is less than about 0.25 μm.

* * * * *